United States Patent
Saitoh et al.

(10) Patent No.: US 8,078,348 B2
(45) Date of Patent: Dec. 13, 2011

(54) ELECTRIC VEHICLE AND REGENERATION CONTROL METHOD FOR ELECTRIC VEHICLE

(75) Inventors: Dai Saitoh, Wako (JP); Kazunori Watanabe, Wako (JP); Kenichiro Kimura, Wako (JP); Kazuo Kotaka, Wako (JP); Yoshikazu Murakami, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 668 days.

(21) Appl. No.: 12/257,048

(22) Filed: Oct. 23, 2008

(65) Prior Publication Data

US 2009/0112386 A1    Apr. 30, 2009

(30) Foreign Application Priority Data

Oct. 25, 2007    (JP) .................... 2007-277442

(51) Int. Cl.
*B60L 11/00* (2006.01)
*B60K 1/00* (2006.01)
(52) U.S. Cl. .......................... 701/22; 180/65.1
(58) Field of Classification Search .............. 701/22; 180/65.1
See application file for complete search history.

(56) References Cited

U.S. PATENT DOCUMENTS

| | | | |
|---|---|---|---|
| 5,775,784 A * | 7/1998 | Koga et al. ........... | 303/152 |
| 5,861,724 A * | 1/1999 | Ackerson ............. | 318/376 |
| 2006/0047400 A1 * | 3/2006 | Prakash et al. ....... | 701/70 |
| 2006/0185914 A1 * | 8/2006 | Hommi ................ | 180/65.1 |
| 2009/0145673 A1 * | 6/2009 | Soliman et al. ....... | 180/65.1 |
| 2009/0240411 A1 * | 9/2009 | Amamiya et al. ..... | 701/70 |

FOREIGN PATENT DOCUMENTS

| | | |
|---|---|---|
| JP | 2001-78305 | 3/2001 |
| JP | 3263844 | 12/2001 |
| JP | 2002-152903 | 5/2002 |
| JP | 2003-164013 | 6/2003 |
| JP | 2003-267698 | 9/2003 |
| WO | WO-97/10966 A1 | 3/1997 |

OTHER PUBLICATIONS

Japanese Office Action for Application No. 2007-277442, dated Oct. 13, 2009.

* cited by examiner

*Primary Examiner* — Isam Alsomiri
(74) *Attorney, Agent, or Firm* — Nelson Mullins Riley & Scarborough LLP; Anthony A. Laurentano

(57) ABSTRACT

An electric vehicle includes a device which determines, on the basis of the gradient of a road surface, a target acceleration of the vehicle in the case where the operational states of an accelerator (gas) pedal and a brake pedal of the vehicle are an OFF state when the vehicle is traveling on a down-slope road, a device which determines the correction amount of a regenerative torque for bringing the actual acceleration of the vehicle close to the target acceleration, a device which determines a basic target torque of an electric motor, which becomes a regenerative torque when the operational state of the accelerator (gas) pedal is the OFF state, on the basis of the operational state of the accelerator (gas) pedal, and a device which determines a target torque by correcting the basic target torque on the basis of at least the aforesaid correction amount. The output torque of the electric motor is controlled to the determined target torque. Thus, when the electric vehicle travels on the down-slope road, the regenerative operation of the electric motor is accomplished such that an acceleration suited to the gradient of the road surface can be generated in the vehicle while minimizing the influences of disturbance factors.

13 Claims, 8 Drawing Sheets

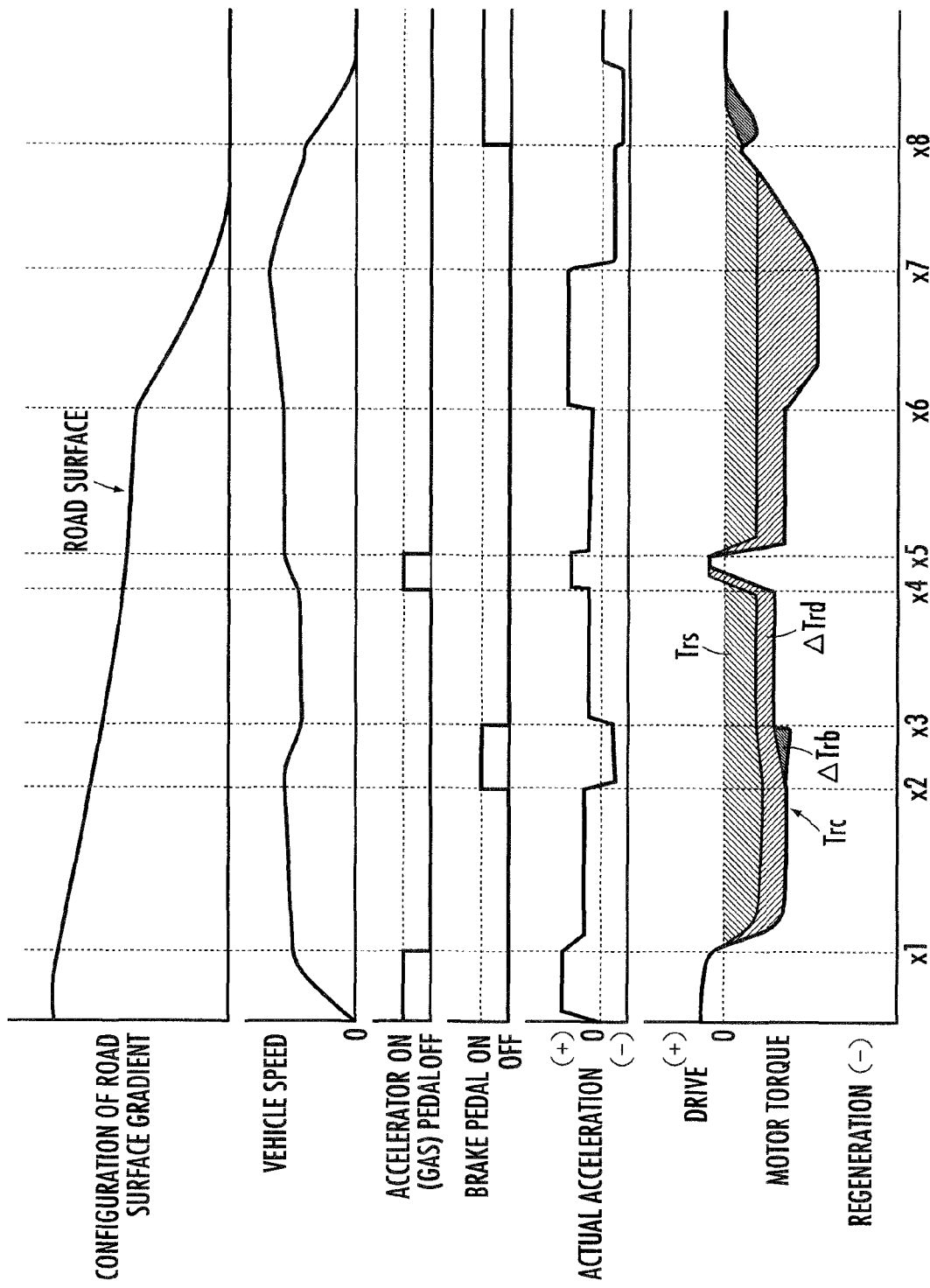

ELECTRIC VEHICLE AND REGENERATION CONTROL METHOD FOR ELECTRIC VEHICLE

BACKGROUND OF THE INVENTION

1. Field of the Invention

The present invention relates to an electric vehicle equipped with an electric motor as a traveling motive power source thereof, and a regeneration control method for the electric vehicle.

2. Description of the Related Art

As an electric vehicle provided with an electric motor as a traveling motive power source thereof, there has been known an electric vehicle disclosed in, for example, PCT international publication WO97/10966 (hereinafter referred to as patent document 1) or the publication of Japanese Patent No. 3263844 (hereinafter referred to as patent document 2). In these electric vehicles, regenerative braking of an electric motor is effected when neither accelerator (gas) pedals nor brake pedals are in operation. According to the technique disclosed in patent document 1 or patent document 2, the regeneration amount of the electric motor is determined by multiplying a basic regeneration amount, which is set by a regeneration amount adjusting switch, by a regeneration gain corresponding to an engine brake, which is determined by adding a reference gain set on the basis of the number of revolutions of the electric motor and an increase/decrease gain set on the basis of the gradient of a road surface. Then, a regenerative operation of the electric motor is performed with the determined regeneration amount.

According to the techniques disclosed in the aforesaid patent documents 1 and 2, the increase/decrease gain is uniquely determined on the basis of the gradient of a road surface. Hence, even if the gradient of the road surface remains unchanged, the acceleration generated in the direction in which the vehicle advances when the electric motor runs in a regenerative operation mode tends to vary due to changes in disturbance factors, such as the direction of wind (whether the wind is blowing against the vehicle or following the vehicle) and the number of persons in the vehicle (the total weight of the vehicle). Especially when the vehicle is traveling on a down-slope road, which tends to cause the vehicle speed to increase, variations in the acceleration of the vehicle attributable to the aforesaid changes in disturbance factors are frequently more notable.

Therefore, a braking force of the vehicle generated by the regenerative operation of the electric motor when the vehicle is traveling on a down-slope road is apt to be excessively weak or strong. This has been apt to inconveniently force a driver to frequently step on the brake pedal or the accelerator (gas) pedal of the vehicle to adjust the vehicle speed.

SUMMARY OF THE INVENTION

The present invention has been made with a view of the background described above, and it is an object of the invention to provide an electric vehicle capable of running an electric motor in a regenerative operation mode such that an acceleration suited to a gradient of a road surface is produced in the vehicle while minimizing the influences of disturbance factors, including the direction of wind and the number of persons in the vehicle, when the electric vehicle travels on a down-slope road, and a regeneration control method for the electric vehicle.

To this end, an electric vehicle in accordance with the present invention is equipped with, as a traveling motive power source, an electric motor capable of selectively outputting a drive torque and a regenerative torque. The electric vehicle also includes: a basic target torque determiner which determines, on the basis of an operational state of an accelerator pedal, a basic target torque, which is a basic target torque of the electric motor and which provides a regenerative torque in the case where the operational state of the accelerator pedal of the vehicle is an OFF state; a gradient grasper which grasps the gradient of a road surface on which the vehicle is traveling; a target acceleration determiner which determines, on the basis of the gradient of the road surface grasped by the gradient grasper, a target acceleration which is a target acceleration of the vehicle in the case where the operational state of a brake pedal of the vehicle and the operational state of the accelerator pedal thereof are the OFF state when the vehicle is traveling on a down-slope road and which is a target acceleration for restraining an increase in the speed of the vehicle more than an acceleration generated in the vehicle in the case where it is assumed that the operational state of the brake pedal of the vehicle and the operational state of the accelerator pedal thereof are the OFF state and that the vehicle is traveling on the down-slope road in a state wherein the electric motor is generating an output torque of the basic target torque; an actual acceleration grasper which grasps an actual acceleration, which is a real acceleration of the vehicle; a down-slope road regeneration correction amount determiner which determines, on the basis of the actual acceleration and the target acceleration, a down-slope road regeneration correction amount, which is a correction amount of a regenerative torque of the electric motor for bringing the actual acceleration close to the target acceleration when the vehicle is traveling on the down-slope road; a target torque determiner which determines a target torque of the electric motor by correcting the basic target torque by at least the down-slope road regeneration correction amount; and a motor controller which controls the energization of the electric motor such that the electric motor generates an output torque of the target torque (a first aspect of the invention).

According to the first aspect of the invention, the target torque of the electric motor when the vehicle is traveling on a down-slope road is determined by correcting the basic target torque by at least the down-slope road regeneration correction amount. Further, the energization of the electric motor (more precisely, the energizing current supplied to the armature windings of the electric motor) is controlled such that an output torque of the target torque is generated in the electric motor.

Here, if the operational state of the brake pedal of the vehicle and the operational state of the accelerator (gas) pedal thereof are the OFF state (hereinafter, this state may be referred to as "the state of down-slope road traveling with the brake pedal and the accelerator (gas) pedal off"), then the basic target torque will be a regenerative torque, that is, a torque which causes a braking force to act on the vehicle. Hence, when an output torque of the basic target torque is produced in the electric motor, a braking force acts on the vehicle. However, the regenerative torque as the basic target torque is a regenerative torque determined without depending on the gradient of a road surface on which the vehicle is traveling, so that the regenerative torque is determined to be a relatively weak regenerative torque (e.g., a regenerative torque which causes a weak braking force corresponding to an engine brake when the vehicle travels on a horizontal flat road to be generated in the vehicle). This is because generating a large regenerative torque in the electric motor when the operational state of the accelerator (gas) pedal is the OFF state would lead to an excessive braking force acting on the vehicle when the vehicle travels on a flat road.

Hence, in the state of down-slope road traveling with the brake pedal and the accelerator (gas) pedal off, the braking force produced in the vehicle when an output torque of the basic target torque is generated in the electric motor will be relatively weak, and the speed of the vehicle tends to increase as the gradient of a road surface increases. According to the first aspect of the present invention, therefore, a target acceleration for restraining an increase in the speed of the vehicle more than an acceleration generated in the vehicle in the case where it is assumed that an output torque of the basic target torque is generated in the electric motor in the state of down-slope road traveling with the brake pedal and the accelerator (gas) pedal off is determined on the basis of the gradient (in terms of a detection value or an estimated value) of a road surface grasped by the gradient grasper. Thus, a target acceleration suited to the gradient of the road surface is determined in the state of down-slope road traveling with the brake pedal and the accelerator (gas) pedal off. The target acceleration may be basically determined to be an acceleration which increases toward a higher speed of the vehicle as the gradient of the road surface increases.

Further, according to the first aspect of the invention, the down-slope road regeneration correction amount for bringing the actual acceleration (in terms of a detection value or an estimated value) close to the target acceleration is determined on the basis of the actual acceleration and the target acceleration. Further, the target torque of the electric motor is determined by correcting the basic target torque by at least the down-slope road regeneration correction amount. Thus, the regenerative torque of the electric motor is adjusted (increased or decreased) in the state of down-slope road traveling with the brake pedal and the accelerator (gas) pedal off so as to bring the actual acceleration close to the target acceleration.

As a result, the first aspect of the invention makes it possible to run the electric motor in the regenerative operation mode such that an acceleration suited for a gradient of a road surface may be generated in the electric vehicle while minimizing the influences of disturbance factors, including the direction of wind and the number of persons in the vehicle, when the vehicle travels on a down-slope road.

The basic target torque determiner may alternatively determine the basic target torque on the basis of the operational state of the accelerator (gas) pedal and the vehicle speed. The acceleration grasper may of course detect the acceleration of the vehicle by means of an acceleration sensor, or the acceleration grasper may alternatively estimate the acceleration of the vehicle from, for example, the detection value of the vehicle speed.

In the first aspect of the invention described above, in the case where the operational state of the accelerator pedal of the vehicle and the operational state of the brake pedal thereof are the OFF state when the vehicle is traveling on a down-slope road, the down-slope road regeneration correction amount determiner determines the down-slope road regeneration correction amount such that the down-slope road regeneration correction amount is gradually increased or decreased according to, for example, a magnitude relationship between the actual acceleration and a target acceleration (a second aspect of the invention).

With this arrangement, it is possible to easily determine a down-slope road regeneration correction amount which allows the basic target torque to be corrected so as to bring an actual acceleration close to a target acceleration without causing a sudden change. This in turn allows the actual acceleration to approximate to the target acceleration while smoothly changing an output torque of the electric motor.

Alternatively, the down-slope road regeneration correction amount may be determined by a feedback control law, such as the PI law or the PID law, from the difference between an actual acceleration and a target acceleration.

Further, in the first aspect or the second aspect of the invention, the down-slope road regeneration correction amount determiner is preferably equipped further with a device which gradually decreases the down-slope road regeneration correction amount in the case where the gradient of a road surface grasped by the gradient grasper has changed from a gradient of a down-slope road to a gradient of a flat road or a gradient of an up-slope road (a third aspect of the invention).

This arrangement makes it possible to restrain an output torque of the electric motor from suddenly changing if the road surface on which the vehicle is traveling changes from a down-slope road to a flat road or an up-slope road.

Further, in the first aspect to the third aspect of the invention, the basic target torque determined by the basic target torque determiner in the case where the operational state of the accelerator pedal of the vehicle is the ON state is a drive torque, and the down-slope road regeneration correction amount determiner is preferably equipped further with a device which gradually decreases the down-slope road regeneration correction amount in the case where the operational state of the accelerator pedal of the vehicle switches from the OFF state to the ON state when the vehicle is traveling on the down-slope road (a fourth aspect of the invention).

This arrangement makes it possible to restrain an output torque of the electric motor from suddenly changing from a regenerative torque to a drive torque in the case where the operational state of the accelerator pedal of the vehicle switches from the OFF state to the ON state when the vehicle is traveling on the down-slope road.

Further, in the first to the fourth aspects of the invention, the down-slope road regeneration correction amount determiner is preferably equipped further with a device which limits an increase in the down-slope road regeneration correction amount in the case where the operational state of the brake pedal of the vehicle switches from the OFF state to the ON state while the vehicle is traveling on the down-slope road (a fifth aspect of the invention).

This arrangement makes it possible to restrain an excessive braking force from acting on the vehicle in the case where the operational state of the braking pedal of the vehicle switches from the OFF state to the ON state while the vehicle is traveling on the down-slope road.

In the fifth aspect of the invention, the device which limits an increase in the down-slope road regeneration correction amount holds the down-slope road regeneration correction amount at, for example, a value immediately before the operational state of the brake pedal switches from the OFF state to the ON state in the case where the operational state of the brake pedal of the vehicle switches from the OFF state to the ON state while the vehicle is traveling on the down-slope road (a sixth aspect of the invention).

According to the sixth aspect of the invention, a braking force imparted by operating the brake pedal will be added to a braking force of the vehicle based on the down-slope road regeneration correction amount immediately before the operational state of the brake pedal switches from the OFF state to the ON state. Hence, the driver of the vehicle will operate the brake pedal on the basis of the braking state of the vehicle immediately before the operational state of the brake pedal is switched from the OFF state to the ON state. As a result, the braking state of the vehicle intended by the driver can be achieved by operating the brake pedal.

Further, in the fifth aspect and the sixth aspect of the invention, preferably, the electric vehicle is further equipped with a brake regeneration correction amount determiner which determines a brake regeneration correction amount, which is a correction amount of a regenerative torque of the electric motor based on the operational state of the brake pedal of the vehicle, on the basis of the operational state of the brake pedal, and the target torque determiner determines the target torque by correcting the basic target torque on the basis of the down-slope road regeneration correction amount and the brake regeneration correction amount when the vehicle is traveling on a down-slope road (a seventh aspect of the invention).

With this arrangement, if the operational state of the brake pedal of the vehicle switches from the OFF state to the ON state while the vehicle is traveling on the down-slope road, it is possible to restrain an excessive braking force from acting on the vehicle while generating a braking force, which is an auxiliary force for a braking force imparted by the brake pedal of the vehicle, by the electric motor.

Supplementally, in the first to the seventh aspects of the invention, to decrease the down-slope road regeneration correction amount means to change the down-slope road regeneration correction amount such that the value obtained by correcting the basic target torque on the basis of the down-slope road regeneration correction amount approximates the basic target torque. Further, to increase the down-slope road regeneration correction amount means to change the down-slope road regeneration correction amount such that the value obtained by correcting the basic target torque on the basis of the down-slope road regeneration correction amount causes the magnitude of a regenerative torque to increase to be larger than the basic target torque.

In the first to the seventh aspects of the invention described above, the gradient grasper may be of course a device which detects the gradient (tilt angle) of a road surface by an inclination sensor, but it is also possible to calculate an estimated value of the gradient of the road surface by predetermined arithmetic processing from at least the target torque as the output torque generated by the electric motor, a detection value of the speed of the vehicle, and the actual acceleration. In other words, it is possible to calculate a drive force acting on the vehicle by using the target torque, and also possible to calculate an acceleration resistance, a rolling resistance, and an air resistance of a traveling resistance of the vehicle by using the detection value of the speed of the vehicle and the aforesaid actual acceleration. Furthermore, a gradient resistance can be calculated according to a force balance relationship from a driving force, an acceleration resistance, a rolling resistance, and an air resistance, which have been estimated. Then, the gradient of a road surface can be estimated from the calculated gradient resistance.

However, when an estimated value of the gradient of the road surface is calculated by the arithmetic processing described above, the estimated value tends to incur an error, depending on a drive condition of the vehicle.

Hence, in the first to the seventh aspects of the invention described above, if the gradient grasper is equipped with a gradient estimated value calculator which calculates an estimated value of the gradient of the road surface by predetermined arithmetic processing from at least the target torque as the output torque generated by the electric motor, the detection value of the speed of the vehicle, and the actual acceleration, then preferably, the gradient grasper is preferably further equipped with a determiner which determines whether or not the drive state of the vehicle is a drive state which establishes a predetermined condition leading to an error of an estimated value of the gradient of the road surface calculated by the gradient estimated value calculator. Preferably, in the case where a determination result of the determiner is negative, then the estimated value of the gradient of the road surface is sequentially calculated by the gradient estimated value calculator and the calculated estimated value is output to the target acceleration determiner, and in the case where the determination result of the determiner is affirmative, then the estimated value of the gradient of the road surface calculated by the gradient estimated value calculator immediately before the determination result became affirmative is output to the target acceleration determiner (an eighth aspect of the invention).

According to the eighth aspect of the invention, if a determination result of the determiner is negative, that is, in a situation wherein the estimated value of the gradient of the road surface calculated by the gradient estimated value calculator is relatively accurate, then the target acceleration is determined on the basis of the estimated value of the gradient, thus making it possible to determine a target acceleration suited to an actual gradient of a road surface. Meanwhile, if the determination result of the determiner is affirmative, that is, in a situation wherein an estimated value of the gradient of a road surface calculated by the gradient estimated value calculator is likely to develop a considerable error, then the target acceleration is determined on the basis of the estimated value of the gradient of the road surface calculated by the gradient estimated value calculator immediately before the determination result became affirmative. In this case, the actual gradient of a road surface usually does not suddenly change. For this reason, at least in a situation wherein not much time has elapsed since the determination result became affirmative, it is possible to prevent a target acceleration which deviates with respect to an actual road surface gradient from being determined by using an estimated value of the gradient which has a considerable error.

In the eighth aspect of the invention, the predetermined condition preferably includes at least one of a condition wherein the operational state of the brake pedal of the vehicle is the ON state and a condition wherein a detection value of the vehicle speed is a low vehicle speed which is lower than a first predetermined value (a ninth aspect of the invention).

More specifically, if the operational state of the brake pedal is the ON state or if the detection value of the vehicle speed is a low vehicle speed which is lower than the first predetermined value, then an error of an estimated value of a road surface gradient calculated by the gradient estimated value calculator tends to become large. Therefore, an arrangement is made to cause the determination result to become affirmative if the aforesaid conditions hold.

In a case where the electric vehicle is equipped with a wheel speed controller which carries out control processing for adjusting a driving force or a braking force to be imparted to the wheels of the vehicle so as to match the wheel speed of the vehicle to an actual speed of the vehicle, the aforesaid predetermined condition preferably includes a condition wherein the control processing by the wheel speed controller is being carried out (a tenth aspect of the invention).

More specifically, when the control processing is being carried out by the wheel speed controller, it means the vehicle is in a situation wherein wheels are slipping or likely to slip, so that the error of an estimated value of a road surface gradient calculated by the gradient estimated value calculator tends to become large. For this reason, an arrangement is made so that the aforesaid determination result becomes affirmative while the wheel speed controller is carrying out the control processing.

The wheel speed controller may use, for example, a so-called antilock brake system, a so-called traction control system, or an anti-side slip device having a feature which integrates the functions of the antilock brake system and the traction control system.

In the eighth aspect to the tenth aspect of the invention, preferably, the gradient grasper is equipped with a device which measures the time during which the determination result of the determiner continuously becomes affirmative, and in the case where the measured time exceeds predetermined time, a value set beforehand as the value of a gradient of a flat road is output to the target acceleration determiner until the determination result of the determiner changes to negative (an eleventh aspect of the invention).

More specifically, if the time during which the determination results of the determiner continuously become affirmative exceeds the predetermined time, then the actual gradient of a road surface may have significantly changed within the predetermined time. Hence, the value of the gradient of a flat road is used to determine a target acceleration. This makes it possible to prevent the electric motor from generating an unwanted regenerative torque when the road surface on which the vehicle is traveling is not a down-slope road.

Further, in the first to the eleventh aspects of the invention described above, preferably, the target acceleration determiner is a device which determines the target acceleration on the basis of the gradient of the road surface grasped by the gradient grasper and the detection value of the speed of the vehicle, and a target acceleration determined by the target acceleration determiner when the detection value of the vehicle speed is smaller than a second predetermined value is a target acceleration on the increasing-speed side of the vehicle than a target acceleration determined by the target acceleration determiner when the detection value of the vehicle speed is larger than the second predetermined value (a twelfth aspect of the invention).

More specifically, when a case where the vehicle speed is relatively slow and a case where the vehicle speed is relatively high are compared, the driver tends to more markedly feel the deceleration of the vehicle in the former case than the latter case even if the braking force acting on the vehicle remains about the same. For this reason, according to the twelfth aspect of the invention, a target acceleration determined by the target acceleration determiner when the detection value of the vehicle speed is smaller than the second predetermined value is set to be a target acceleration on the increasing-speed side of the vehicle than a target acceleration determined by the target acceleration determiner when the detection value of the vehicle speed is larger than the second predetermined value.

This arrangement makes it possible to reduce the deceleration felt by the driver when the detection value of the vehicle speed is smaller than the second predetermined value.

Further, a regenerative control method for an electric vehicle in accordance with the present invention is a regenerative control method for a down-slope road travel of an electric vehicle equipped with an electric motor, which is capable of selectively outputting a drive torque and a regenerative torque, as a traveling motive power source, the regenerative control method including: a step for determining a basic target torque which is a basic target torque of the electric motor and which provides a regenerative torque in the case where the operational state of the accelerator pedal of the vehicle is an OFF state, on the basis of an operational state of an accelerator pedal; a step for determining, on the basis of a gradient of a road surface on which the vehicle is traveling, a target acceleration, which is a target acceleration of the vehicle in the case where the operational state of a brake pedal of the vehicle and the operational state of the accelerator pedal thereof are the OFF state when the vehicle is traveling on a down-slope road and which is a target acceleration for restraining an increase in the speed of the vehicle so that the increase in the speed is less than an acceleration generated in the vehicle in the case where it is assumed that the operational state of the brake pedal of the vehicle and the operational state of the accelerator pedal thereof are the OFF state and that the vehicle is traveling on the down-slope road in a state wherein the electric motor is generating an output torque of the basic target torque; a step for determining, on the basis of an actual acceleration and the target acceleration, a down-slope road regeneration correction amount, which is a correction amount of a regenerative torque of the electric motor for bringing the actual acceleration, which is the real acceleration of the vehicle, close to the target acceleration when the vehicle is traveling on the down-slope road; and a step for determining a target torque of the electric motor by correcting the basic target torque by at least the down-slope road regeneration correction amount and for controlling the energization of the electric motor such that the electric motor generates an output torque of the target torque (a thirteenth aspect of the invention).

According to the thirteenth aspect of the invention, as with the first aspect of the invention, the regenerative torque of the electric motor is adjusted such that the actual acceleration of the vehicle approximates to a target acceleration suited to a gradient of a road surface in the state of down-slope road traveling with the brake pedal and the accelerator (gas) pedal off. Thus, according to the thirteenth aspect of the invention, as with the first aspect of the invention, it is possible to run the electric motor in the regenerative operation mode such that acceleration suited to a gradient of a road surface is generated in the electric vehicle while minimizing the influences of disturbance factors, such as the direction of wind and the number of persons in the vehicle, when the vehicle is traveling on a down-slope road.

BRIEF DESCRIPTION OF THE DRAWINGS

FIG. 8 is a diagram illustrating an example of how an output torque or the like of an electric motor changes when the vehicle of the embodiment travels on a down-slope road.

DESCRIPTION OF THE PREFERRED EMBODIMENTS

Figure 1:
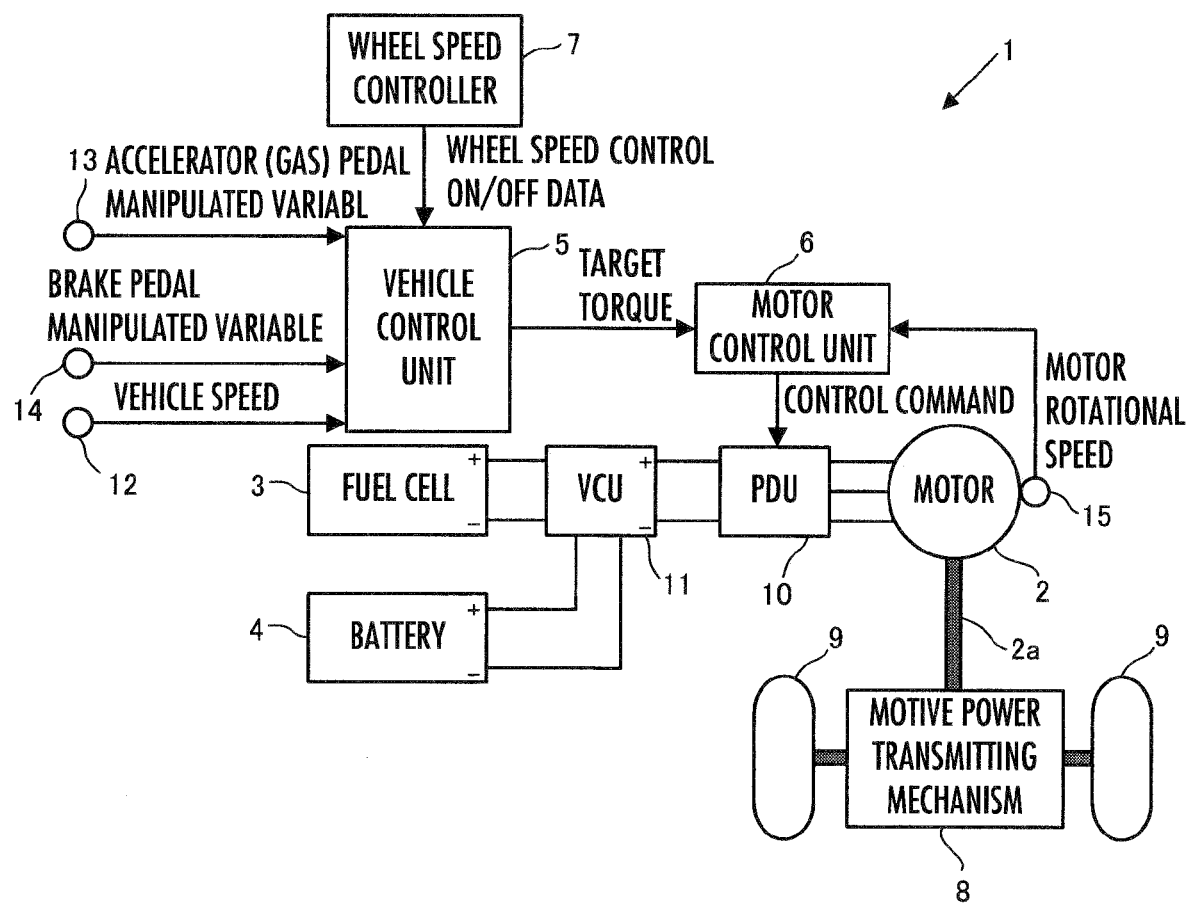
FIG. 1 is a diagram illustrating a general system construction of an electric vehicle according to an embodiment of the present invention.

An embodiment of the present invention will be described with reference to FIG. 1 to FIG. 8. First, referring to FIG. 1, the general system construction of an electric vehicle according to the present embodiment will be described. FIG. 1 is a diagram illustrating the system construction.

As illustrated in FIG. 1, an electric vehicle 1 according to the present embodiment (hereinafter referred to simply as "the vehicle 1" in most cases) is equipped with an electric motor 2 serving as a traveling motive power source, a fuel cell 3 and a battery 4 serving as power sources of the electric motor 2, a vehicle control unit 5 which sequentially determines a target torque, which is a target value of an output torque of the electric motor 2, a motor control unit 6 which controls the energization of the electric motor 2 on the basis of the target torque, and a wheel speed controller 7 which adjusts a driving force or a braking force to be imparted to each wheel of the vehicle 1 from the electric motor 2 or a braking device (not shown) such that the wheel speed of each wheel of the vehicle 1 (the rotational speed of each wheel or the value of vehicle speed converted from the rotational speed) matches an actual vehicle speed of the vehicle 1, i.e., such that the slippage of each wheel is restrained.

The motor control unit 6 and the wheel speed controller 7 correspond to the motor controlling means and the wheel speed controlling means, respectively, in the present invention.

An output shaft 2a of the electric motor 2 is connected to drive wheels 9, 9 (the two front wheels or the two rear wheels in the illustrated example) through the intermediary of a motive power transmitting mechanism 8 composed mainly of a transmission and a differential gear unit. The output shaft 2a transmits an output torque of the electric motor 2 to the drive wheels 9, 9 through the intermediary of the motive power transmitting mechanism 8. The drive wheels 9, 9 are the two front wheels or rear wheels in the illustrated example; alternatively, however, both front wheels and rear wheels may be the drive wheels.

Further, the armature windings (not shown) of the electric motor 2 are electrically connected to the fuel cell 3 and the battery 4 through the intermediary of a power drive unit 10 (hereinafter referred to as "the PDU 10") and a power source control unit 11 (hereinafter referred to as "the VCU 11").

Here, the VCU 11 is an electronic circuit unit which includes a DC/DC converter (not shown) and the like. The VCU 11 has a function for adjusting, through the DC/DC converter, a voltage (a power supply voltage of the electric motor 2) to be supplied to the PDU 10 from the fuel cell 3 or the battery 4. The VCU 11 has another function for charging the battery 4 with the power output from the fuel cell 3 or for charging the battery 4 with generated power output from the electric motor 2 through the intermediary of the PDU 10 when the electric motor 2 runs in the regenerative operation mode.

Further, the PDU 10 is an electronic circuit unit which includes an inverter circuit (not shown) and the like, and turning ON/OFF of switch elements of the inverter circuit is controlled according to control commands supplied from the motor control unit 6. This control enables the PDU 10 to have a function for establishing bidirectional passage of current between the fuel cell 3 or the battery 4 and the electric motor 2. The control of the inverter circuit of the PDU 10 allows the electric motor 2 to be selectively operated in the power running operation mode and the regenerative operation mode. Here, the operation in the power running mode is a mode in which the electric motor 2 outputs a drive torque, which provides a driving force, to the drive wheels 9, 9 through the output shaft 2a. In the power running mode, the inverter circuit of the PDU 10 is controlled such that the electric power of the fuel cell 3 or the battery 4 which is output from the VCU 11 is supplied to the electric motor 2. In the regenerative operation mode, the electric motor 2 generates power from the kinetic energy of the vehicle 1 transmitted from the drive wheels 9, 9. In the regenerative operation mode, the inverter circuit of the PDU 10 is controlled such that the generated power of the electric motor 2 is output to the VCU 11 (consequently charges the battery 4 with the generated power through the intermediary of the VCU 11). Then, in the regenerative operation mode, the electric motor 2 outputs a regenerative torque, which provides a braking force, to the drive wheels 9, 9 from the output shaft 2a.

The wheel speed controller 7 is constructed of a publicly known traction control system, an anti-lock brake system, or an anti-side slip device which integrates the functions of the traction control system and the anti-lock brake system. Therefore, although no detailed explanation will be given in the present description, the wheel speed controller 7 matches the wheel speed of each wheel to an actual vehicle speed by adjusting an output torque of the electric motor 2, or by adjusting the distribution of motive power from the electric motor 2 to the drive wheels 9, 9 through the intermediary of the motive power transmitting mechanism 8, or by adjusting a braking force of the wheels imparted by the braking device or the distribution thereof in a situation wherein slip of a wheel occurs.

The vehicle control unit 5 is an electronic circuit unit which includes mainly a microcomputer. The vehicle control unit 5 receives detection data from a vehicle speed sensor 12 for detecting the speed of the vehicle (a vehicle speed detector), an accelerator (gas) pedal sensor 13 for detecting the operational state of the accelerator (gas) pedal of the vehicle 1 (an accelerator (gas) pedal operation detector), and a brake pedal sensor 14 for detecting the operational state of the brake pedal of the vehicle 1 (a brake pedal operation detector). In this case, the accelerator (gas) pedal sensor 13 detects the amount of depression on the accelerator (gas) pedal (not shown) of the vehicle 1 (hereinafter referred to as "the accelerator (gas) pedal manipulated variable"), and outputs the detection value to the vehicle control unit 5 as the detection data on the operational state of the accelerator (gas) pedal. The brake pedal sensor 14 detects a depressing force applied to the brake pedal (not shown) of the vehicle 1 (hereinafter referred to as "the brake pedal manipulated variable") and outputs the detection value to the vehicle control unit 5 as the detection data on the operational state of the brake pedal.

Supplementally, a state wherein the detection value of the accelerator (gas) pedal manipulated variable is zero means a state wherein the accelerator (gas) pedal is not being operated, i.e., the accelerator (gas) pedal is OFF, whereas a state wherein the detection value of the accelerator (gas) pedal manipulated variable is not zero means a state wherein the accelerator (gas) pedal is being operated, i.e., the accelerator (gas) pedal is ON. Thus, the detection values of the accelerator (gas) pedal manipulated variables serve also as the detection data on whether the accelerator (gas) pedal is ON or OFF. Similarly, the state wherein the detection value of the brake pedal manipulated variable is zero means a state wherein the brake pedal is not being operated, i.e., the brake pedal is OFF, whereas a state wherein the detection value of the brake pedal manipulated variable is not zero means a state wherein the brake pedal is being operated. Thus, the detection values of the brake pedal manipulated variables serve also as detection data on whether the brake pedal is ON or OFF.

The vehicle control unit 5 further receives wheel speed control ON/OFF data indicating whether the processing for adjusting wheel speed is being carried out by the wheel speed controller 7 (whether the wheel speed controller 7 is in operation) from the wheel speed controller 7. Hereinafter, the state wherein the wheel speed controller 7 is operating and the state wherein the wheel speed controller 7 is not operating will be referred to as the ON state and the OFF state, respectively, of the wheel speed controller 7.

Then, the vehicle control unit 5 uses the detection value of the vehicle speed, the detection value of the accelerator (gas) pedal manipulated variable, the detection value of the brake pedal manipulated variable, and the wheel speed control ON/OFF data, which are input as described above, in carrying out the processing, which will be discussed later, at a predetermined arithmetic processing cycle. This processing sequentially determines the target torque of the electric motor 2. The target torque of the electric motor 2 means a target drive torque when the electric motor 2 is in the power running mode, or a target regenerative torque when the electric motor 2 is in the regenerative operation mode. In the present embodiment, for the sake of convenience, a target drive torque takes a positive value, while a target regenerative torque takes a negative value.

The motor control unit 6 is an electronic circuit unit which includes mainly a microcomputer. The motor control unit 6 receives a target torque of the electric motor 2 from the vehicle control unit 5 and a detection value of a rotational speed of the output shaft 2a of the electric motor 2 (hereinafter referred to as "the motor rotational speed") from the rotational speed sensor 15 provided in the electric motor 2. Then, the motor control unit 6 uses these input values to determine the energizing current supplied to the armature windings for making an actual output torque of the electric motor 2 coincide with a target torque. Further, the motor control unit 6 generates a control command for the inverter circuit of the PDU 10 to supply the determined energizing current to the armature windings and outputs the generated control command to the PDU 10. Thus, the passage of current to the electric motor 2 is controlled so as to generate an output torque of the target torque in the electric motor 2.

Supplementally, when the wheel speed controller 7 is ON, there are cases where the target torque of the electric motor 2 is changed from the target torque determined by the vehicle control unit 5. In such a case, the motor control unit 6 controls the passage of current to the armature windings of the electric motor 2 on the basis of the updated target torque.

Figure 2:
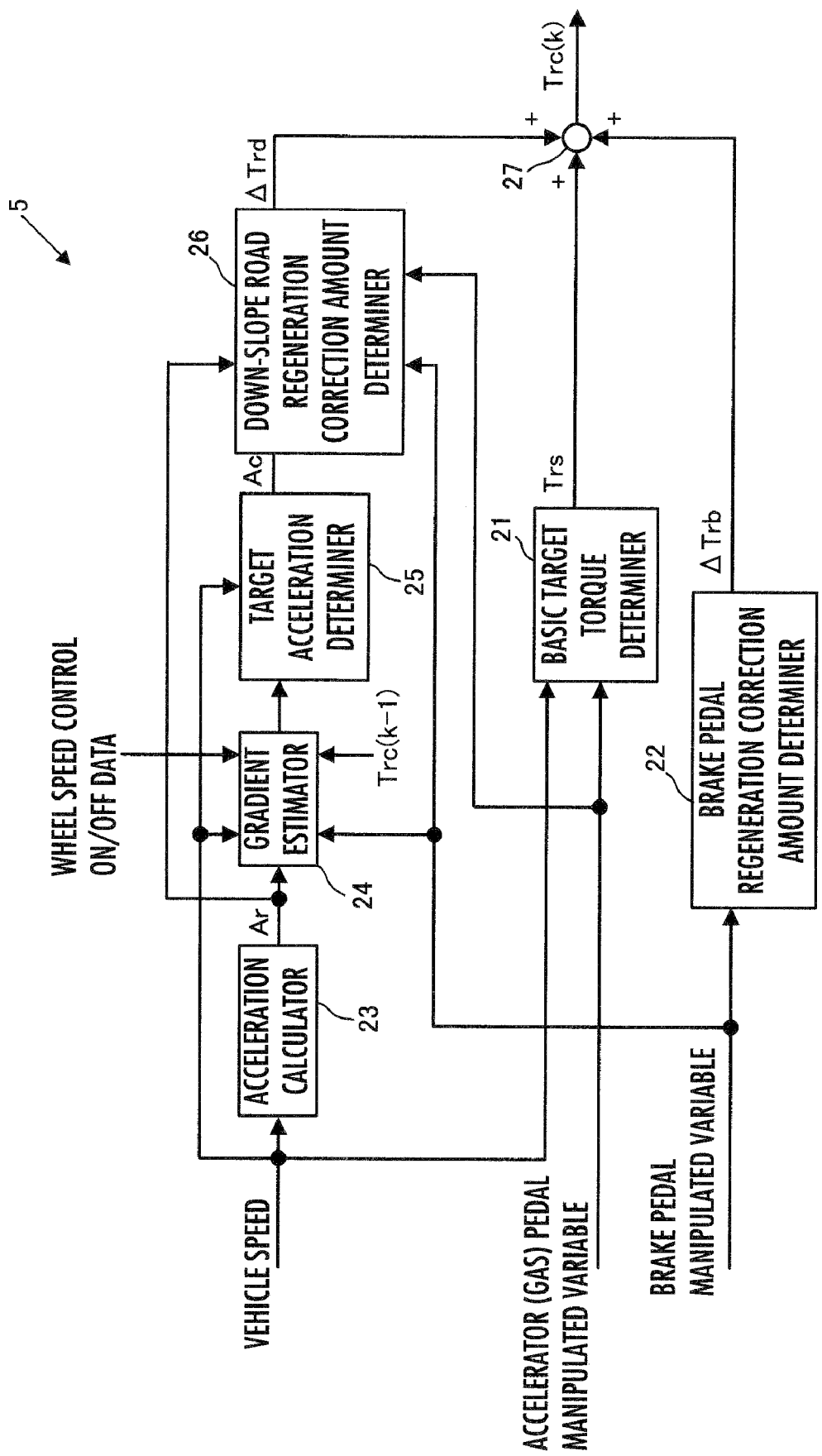
FIG. 2 is a block diagram illustrating the functions of a vehicle control unit provided in the electric vehicle according to the embodiment.

More detailed functions of the vehicle control unit 5 will now be described with reference to FIG. 2. FIG. 2 is a block diagram illustrating major functions of the vehicle control unit 5. The processing by the vehicle control unit 5 is sequentially carried out at a predetermined arithmetic processing cycle. In the following description, therefore, a variable value at a present (current) arithmetic processing cycle may be referred to as the current value, and a variable value at a last (previous) arithmetic processing cycle may be referred to as the previous value. Further, in order to distinguish between the current value and the previous value, these values may be accompanied by suffixes (k) and (k−1), respectively.

"k" denotes an integer value which means time in a discrete-time system.

The vehicle control unit 5 has, as its functional constituent components, a basic target torque determiner 21 which sequentially determines a basic target torque Trs, which is a basic required value of a target torque of the electric motor 2, on the basis of the detection values of the vehicle speed and the accelerator (gas) pedal manipulated variable, and a brake regeneration correction amount determiner 22 which sequentially determines a brake regeneration correction amount $\Delta Trb$ ($\leqq 0$), which is the correction amount of the regenerative torque of the electric motor 2, on the basis of the detection value of a brake pedal manipulated variable.

The basic target torque determiner 21 and the brake regeneration correction amount determiner 22 correspond to the basic target torque determining means and the brake regeneration correction amount determining means, respectively, in the present invention.

In this case, the basic target torque determiner 21 determines the basic target torque Trs on the basis of the detection values (current values) of received vehicle speed and accelerator (gas) pedal manipulated variable according to a preset map, which specifies the relationship among vehicle speeds, accelerator (gas) pedal manipulated variables, and basic target torques. The basic target torque Trs is determined such that it becomes a drive torque (>0) when the operational state of the accelerator (gas) pedal is the ON state. The basic target torque Trs as the drive torque is basically determined such that it provides a larger drive torque as the accelerator (gas) pedal manipulated variable increases or the vehicle speed increases. Further, if the operational state of the accelerator (gas) pedal is the OFF state, then the basic target torque Trs is determined such that it becomes a regenerative torque (<0) corresponding to an engine brake. The basic target torque Trs as the regenerative torque is a braking torque for generating, in the vehicle 1, a relatively weak braking force for gently decelerating the vehicle 1 when the vehicle 1 is traveling on a flat road (horizontal road surface).

In the present embodiment, the basic target torque Trs has been determined on the basis of the vehicle speed and the detection value of an accelerator (gas) pedal manipulated variable. Alternatively, however, the basic target torque Trs may be determined on the basis of only the detection value of an accelerator (gas) pedal manipulated variable.

The brake regeneration correction amount determiner 22 determines the brake regeneration correction amount $\Delta Trb$ from an input detection value of a brake pedal manipulated variable (current value) according to a preset table which specifies the relationship between brake pedal manipulated variables and brake regeneration correction amounts. The brake regeneration correction amount $\Delta Trb$ ($\leqq 0$) is added to the aforesaid basic target torque Trs to correct the basic target torque Trs in the direction of regeneration (in a negative direction). The brake regeneration correction amount $\Delta Trb$ is basically determined such that the torque obtained by correcting the basic target torque Trs by the brake regeneration correction amount $\Delta Trb$ increases in the direction of regeneration as the brake pedal manipulated variable increases. If the brake pedal manipulated variable is zero, i.e., if the brake pedal is in the OFF state, then the brake regeneration correction amount $\Delta Trb$ is determined to be zero.

The vehicle control unit 5 is further equipped with an acceleration calculator 23 which calculates (estimates) an actual acceleration Ar as the real acceleration of the vehicle 1 (the acceleration in the direction in which the vehicle is advancing), a gradient estimator 24 which estimates the gradient of a road surface on which the vehicle 1 is traveling (the tilt angle in the direction in which the vehicle 1 is advancing), a target acceleration determiner 25 which determines a target acceleration Ac in the direction in which the vehicle 1 is advancing when the operational states of the brake pedal and the accelerator (gas) pedal are both OFF state while the vehicle 1 is traveling on a down-slope road, a down-slope road regeneration correction amount determiner 26 which determines a down-slope road regeneration correction amount $\Delta Trd$ ($\leqq 0$), which is the correction amount of a regenerative torque of the electric motor 2 for bringing the actual acceleration Ar close to the target acceleration Ac, when the vehicle 1 is traveling on a down-slope road, and a target torque determiner 27 which determines a target torque Trc of the electric motor 2 by correcting the basic target torque Trs by the brake regeneration correction amount ΔTrb and the down-slope road regeneration correction amount ΔTrd. Incidentally, the acceleration calculator 23, the gradient estimator 24, the target acceleration determiner 25, the down-slope road regeneration correction amount determiner 26, and the target torque determiner 27 correspond to the actual acceleration grasping means, the gradient estimating means, the target acceleration determining means, the down-slope road regeneration correction amount determining means, and the target torque determining means, respectively, in the present invention.

In this case, a detection value of the vehicle speed is sequentially input to the acceleration calculator 23. Then, the acceleration calculator 23 sequentially calculates the temporal change rate (differential value) of the received vehicle speed detection value as an actual acceleration Ar. The actual acceleration in the advancing direction of the vehicle 1 may be alternatively detected by an acceleration sensor provided in the vehicle 1.

The gradient estimator 24 sequentially receives a vehicle speed detection value (current value), an actual acceleration Ar (current value), and the latest value (i.e., a previous value Trc(k−1)) of the target torque Trc already determined by the target torque determiner 27. The current output torque of the electric motor 2 is controlled to the previous value Trc(k−1) of the target torque Trc, so that the previous value Trc(k−1) corresponds to the current actual output torque of the electric motor 2.

Further, the gradient estimator 24 basically uses the input values in carrying out arithmetic processing, which will be described later, thereby to sequentially estimate the gradient of the road surface on which the vehicle 1 is traveling, and then outputs the estimated value of the gradient to the target acceleration determiner 25. In this case, according to the present embodiment, the estimated value of the gradient is zero on a flat road, a positive value on an up-slope road, and a negative value on a down-slope road. The gradient estimator 24 receives, in addition to the aforesaid input values, the wheel speed control ON/OFF data (current value), the detection value of the brake pedal manipulated variable (current value), and the detection value of the vehicle speed (current value). Further, the gradient estimator 24 also carries out the processing for adjusting, as necessary, the estimated value of a gradient to be output to the target acceleration determiner 25 on the basis of predetermined determination processing based on the above input values.

Further, an estimated value (current value) of a gradient determined by the gradient estimator 24 and a detection value (current value) of the vehicle speed are sequentially input to the target acceleration determiner 25. Subsequently, if the received estimated value of the gradient is an estimated value of the gradient of a down-slope road, then the target acceleration determiner 25 determines the target acceleration Ac of the vehicle 1 on the basis of the estimated value of the gradient and the detection value of the vehicle speed, as will be described later.

Further, the down-slope road regeneration correction amount determiner 26 receives the target acceleration Ac (current value) and the actual acceleration Ar (current value). Then, the down-slope road regeneration correction amount determiner 26 basically uses these input values in carrying out the arithmetic processing, which will be discussed hereinafter, to sequentially determine the down-slope road regeneration correction amount ΔTrd. The determined down-slope road regeneration correction amount ΔTrd is added to the basic target torque Trs thereby to correct the basic target torque Trs in the direction of regeneration, i.e., the negative direction. The down-slope road regeneration correction amount ΔTrd is basically determined such that the torque obtained by correcting the basic target torque Trs by the down-slope road regeneration correction amount ΔTrd will be a torque which allows the actual acceleration Ar to approximate the target acceleration Ac. The down-slope road regeneration correction amount determiner 26 receives, in addition to the aforesaid input values, the detection values (current values) of an accelerator (gas) pedal manipulated variable and a brake pedal manipulated variable. Based on these input values, the down-slope road regeneration correction amount determiner 26 carries out processing mainly to gradually reduce the down-slope road regeneration correction amount ΔTrd (i.e., to approximate the down-slope road regeneration correction amount ΔTrd to zero).

Figure 3:
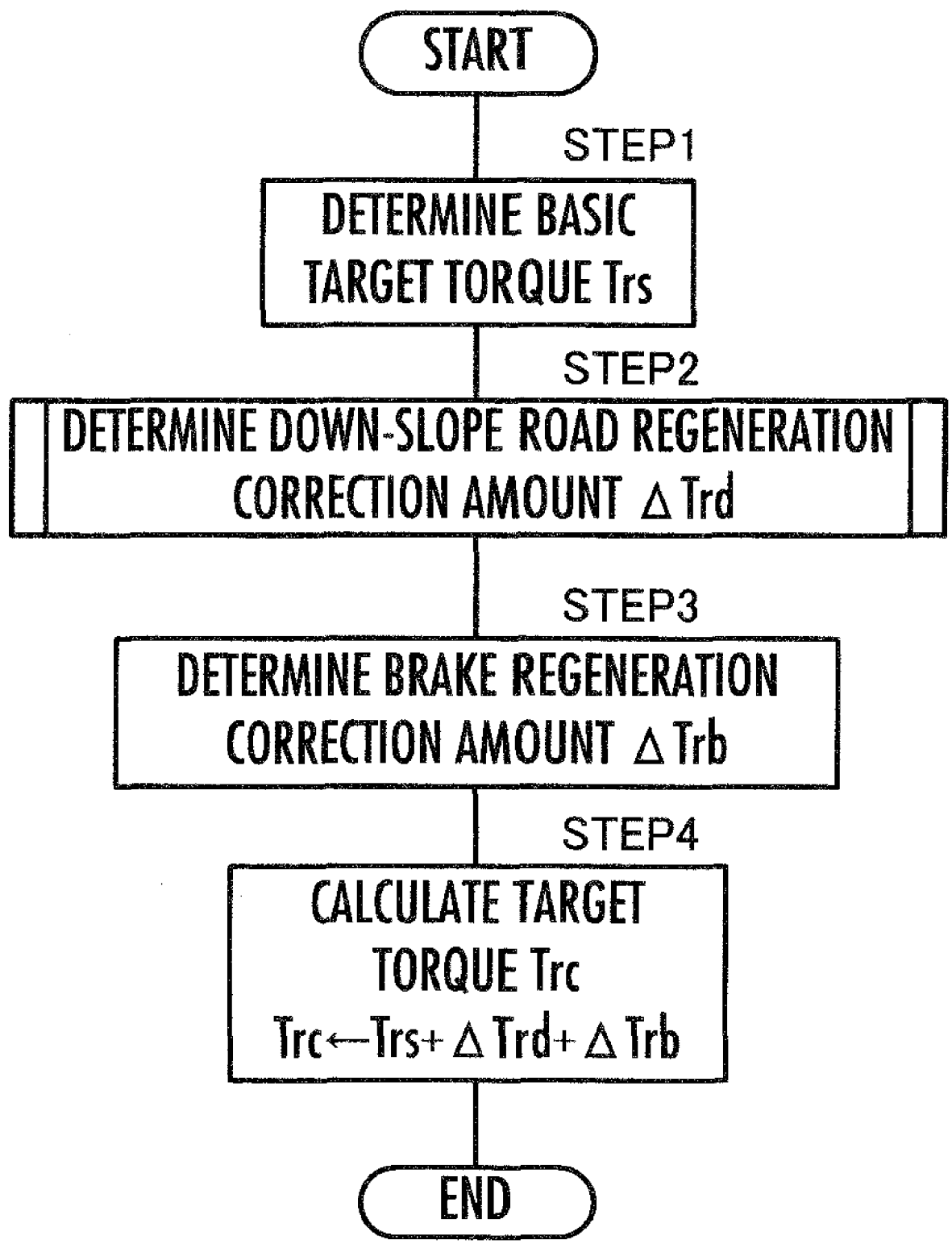
FIG. 3 is a flowchart illustrating the general processing by the vehicle control unit in FIG. 2.
Figure 4:
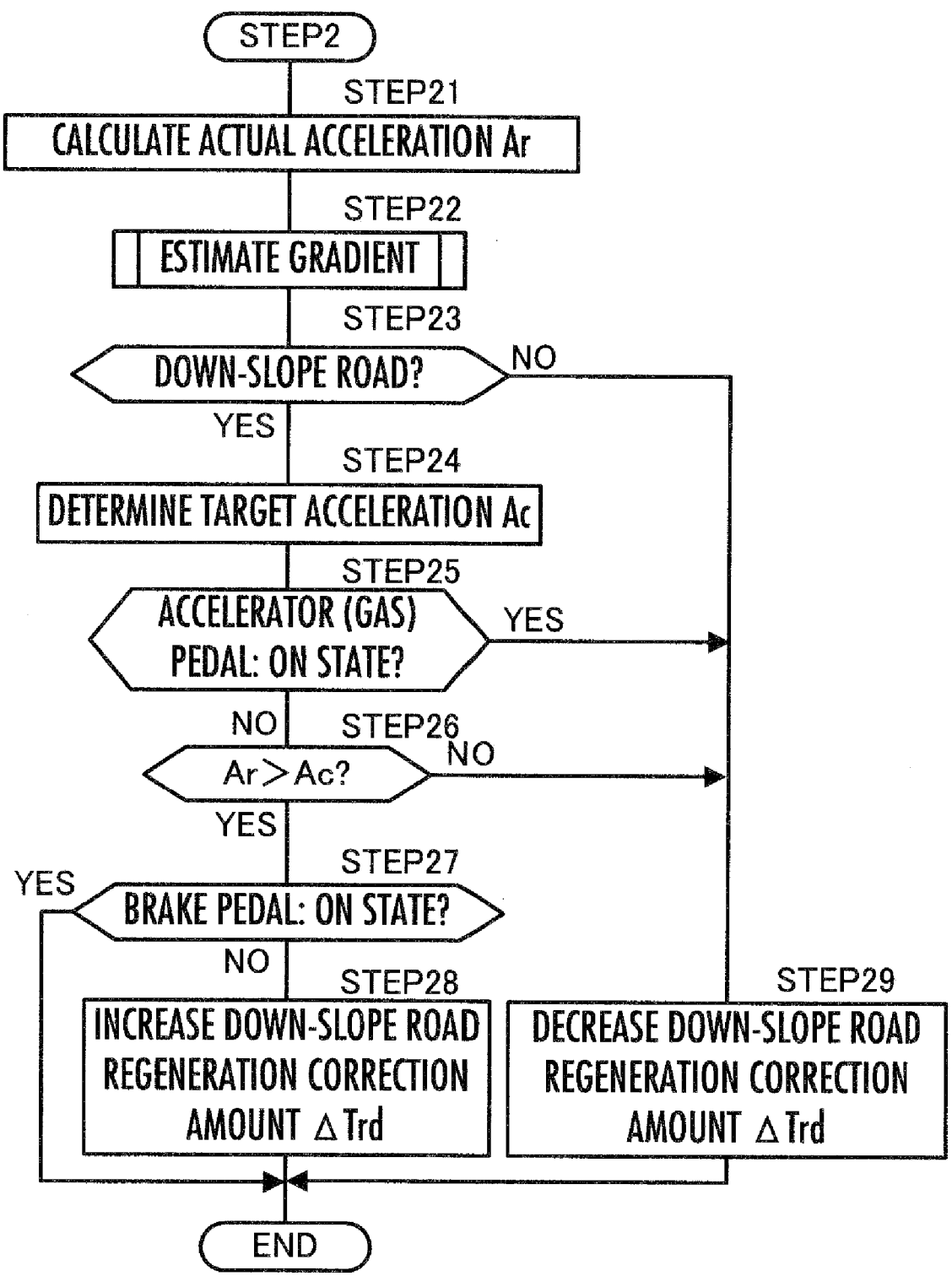
FIG. 4 is a flowchart illustrating the subroutine processing in STEP2 in FIG. 3.
Figure 5:
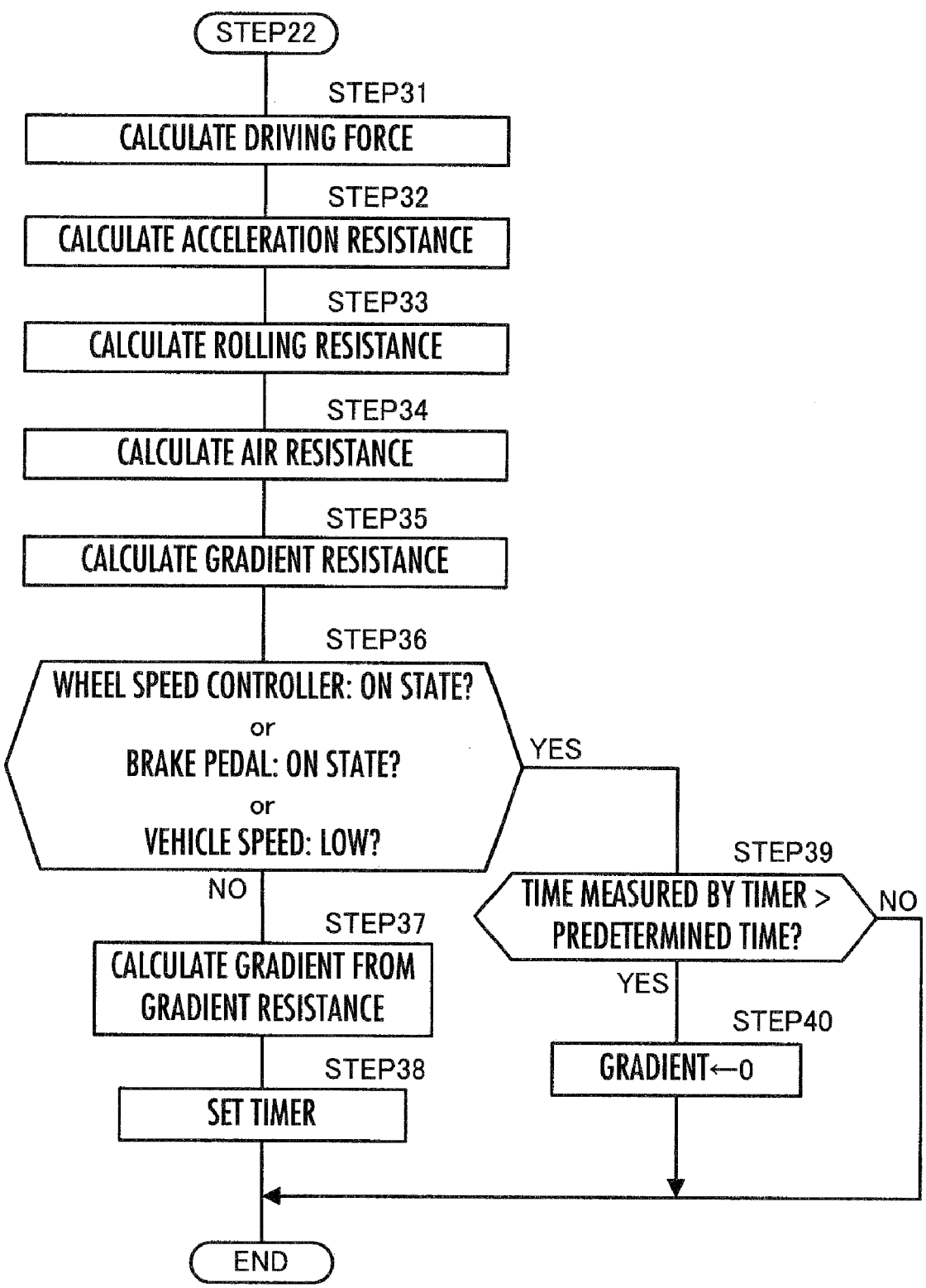
FIG. 5 is a flowchart illustrating the subroutine processing in STEP22.
Figure 6:
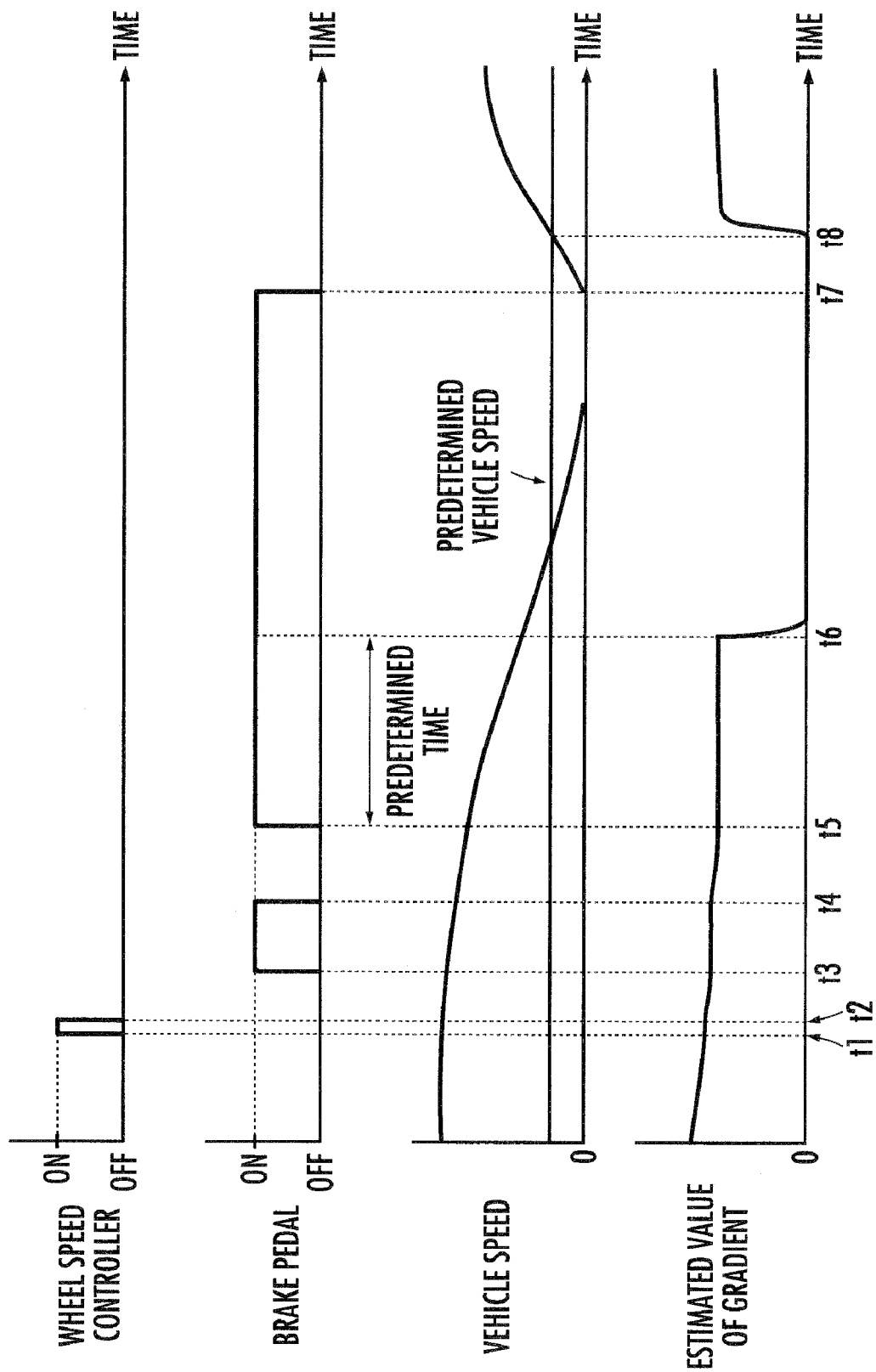
FIG. 6 is a timing chart related to the processing of the flowchart in FIG. 5.
Figure 7:
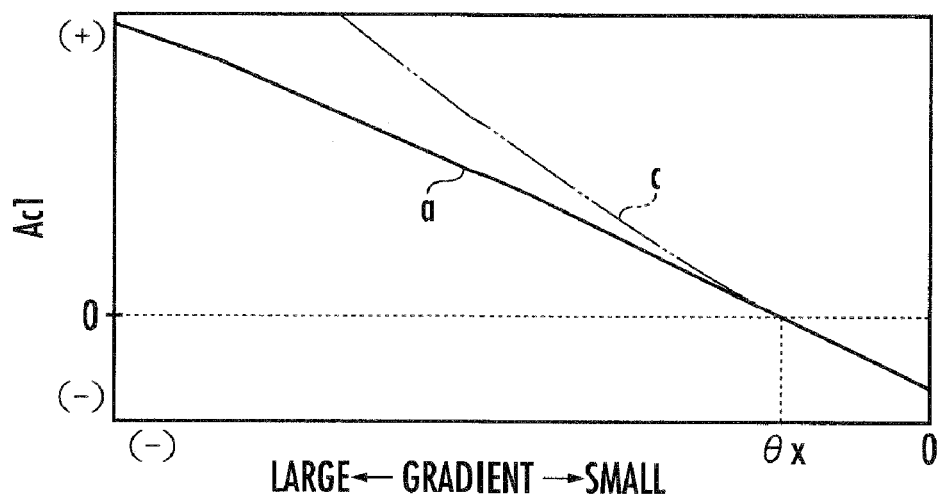
FIG. 7($a$) and FIG. 7($b$) illustrate the tables used in the processing in STEP25 in FIG. 4.
Figure 7:
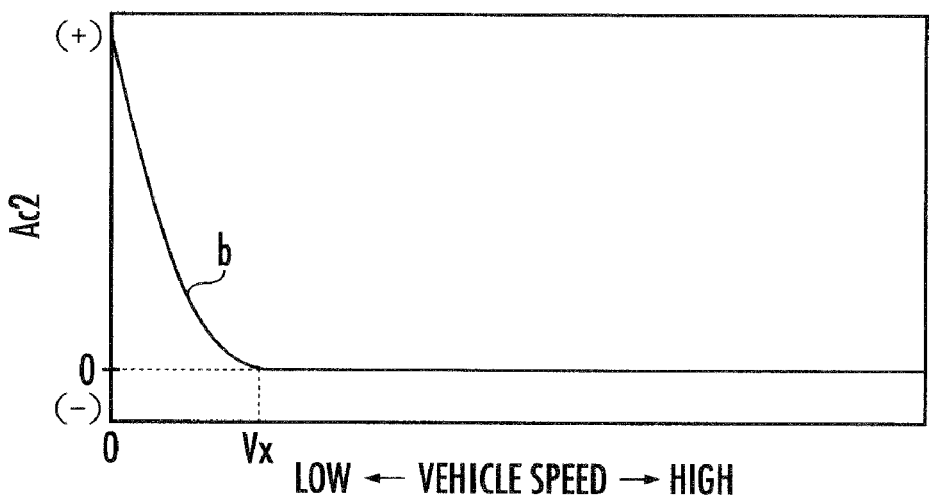

Referring now to FIG. 3 to FIG. 7, the control processing by the vehicle control unit 5 having the functional constituent elements described above will be discussed in detail. FIG. 3 is a flowchart illustrating the general processing carried out by the vehicle control unit 5, FIG. 4 is a flowchart illustrating the subroutine processing in STEP2 of FIG. 3, FIG. 5 is a flowchart illustrating the subroutine processing in STEP22 of FIG. 4, FIG. 6 is a timing chart related to the processing of the flowchart of FIG. 5, and FIG. 7($a$) and FIG. 7($b$) are tables used for the processing in STEP25 of FIG. 4.

The vehicle control unit 5 sequentially carries out the processing illustrated by the flowchart of FIG. 3 at a predetermined arithmetic processing cycle.

The vehicle control unit 5 first determines the basic target torque Trs (current value) of the electric motor 2 by the basic target torque determiner 21 (STEP1). In this case, as described above, the basic target torque Trs is determined according to the map from the detection values (current values) of the vehicle speed and the accelerator (gas) pedal manipulated variable.

Then, the vehicle control unit 5 determines the down-slope road regeneration correction amount ΔTrd (current value) (STEP2). The processing by the acceleration calculator 23, the gradient estimator 24, the target acceleration determiner 25, and the down-slope road regeneration correction amount determiner 26 is carried out in STEP2 to determine the down-slope road regeneration correction amount ΔTrd. The processing in STEP2 will be discussed in detail later.

Subsequently, the vehicle control unit 5 determines the brake regeneration correction amount ΔTrb (current value) by the brake regeneration correction amount determiner 22 (STEP3). In this case, as described above, the brake regeneration correction amount ΔTrb is determined according to the table from the detection value (current value) of the brake pedal manipulated variable.

The executing order of the steps, STEP1 to STEP3, of the processing may be arbitrarily changed.

Subsequently, the vehicle control unit 5 calculates the target torque Trc (current value) of the electric motor 2 by the target torque determiner 27 (STEP4). In this case, the down-slope road regeneration correction amount ΔTrd and the brake regeneration correction amount ΔTrb determined in STEP2 and STEP3, respectively, are added to the basic target torque Trs determined in STEP1 thereby to correct the basic target torque Trs (refer to the expression in FIG. 3). Then, the corrected torque value (=Trs+ΔTrd+ΔTrb) is determined as the target torque Trc. If the operational state of the brake pedal is the OFF state, then ΔTrb is zero, so that the basic target torque Trs will be corrected virtually only by the down-slope road regeneration correction amount ΔTrd, leading to Trc=Trs+ΔTrd. Further, in a state wherein ΔTrb=ΔTrd=0, the target torque Trc agrees with the basic target torque Trs.

The processing from STEP1 to STEP4 described above is implemented at a predetermined arithmetic processing cycle, thereby sequentially determining the target torque Trc.

The target torque Trc determined as described above is sequentially input to the motor control unit 6 from the vehicle control unit 5. At this time, as described above, the motor control unit 6 controls the energizing current supplied to the armature windings of the electric motor 2 such that an output torque of the target torque Trc is output from the electric motor 2.

As described above, when the wheel speed controller 7 is ON, the target torque Trc of the electric motor 2 determined by the vehicle control unit 5 may be changed. In this case, the motor control unit 6 controls the energizing current to be supplied to the armature windings of the electric motor 2 such that the updated target torque is output from the electric motor 2.

The aforesaid processing in STEP2 is carried out as illustrated by the flowchart of FIG. 4. More specifically, the vehicle control unit 5 first calculates the actual acceleration Ar (current value) as described above by the acceleration calculator 23 (STEP21). Then, the vehicle control unit 5 estimates the gradient of the road surface on which the vehicle 1 is currently traveling by the gradient estimator 24 (STEP22).

The processing in STEP22 is carried out as illustrated by the flowchart in FIG. 5. The gradient estimator 24 calculates a driving force generated in vehicle 1 by an output torque currently provided by the electric motor 2 (≈previous value Trc(k−1) of the target torque Trc), which is transmitted to the drive wheels 9, 9 (STEP31). The driving force is calculated by dividing the drive torque of the drive wheels 9, 9, which is determined from the previous value Try(k−1) of the target torque Trc of the electric motor 2 and the speed reduction ratio of the motive power transmitting mechanism 8, by the effective radius of the drive wheels 9, 9. The effective radius of the drive wheels 9, 9 is a fixed value which is set beforehand. The speed reduction ratio of the motive power transmitting mechanism 8 is determined on the basis of a current change gear ratio (a detection value or a command value) of a transmission provided in the motive power transmitting mechanism 8.

Supplementally, if the current output torque of the electric motor 2 is a regenerative torque (if Tr(k−1)<0), then the driving force calculated in STEP1 will be a negative value, and the driving force of the negative value will actually function as a braking force.

Subsequently, the gradient estimator 24 carries out the processing of STEP32 to STEP35 to calculate an acceleration resistance, a rolling resistance, an air resistance, and a gradient resistance, respectively, as a traveling resistance acting on the vehicle 1.

In this case, the acceleration resistance is calculated according to expression (1) given below.

Acceleration resistance[kN]=(Total weight of vehicle [kN]+Inertial weight of rotating portion[kN])× (Acceleration[m/s²]/Gravitational acceleration [m/s²])   (1)

In expression (1), the "total weight of vehicle" indicates a gravitational conversion value of the total mass of the vehicle 1 (the product of the total mass and the gravitational acceleration), and the "Inertial weight of rotating portion" is obtained by weight-converting the inertial moment of a rotating portion of the motive power transmitting system of the vehicle 1 (e.g., the output shaft 2a of the electric motor 2, the rotating shaft and the gears of the motive power transmitting mechanism 8, and the drive wheels 9, 9), matching the total weight of the vehicle and a unit system. The "Total weight of vehicle" and the "Inertial weight of rotating portion" are set to fixed values set beforehand in the present embodiment. Further, as the value of the acceleration in expression (1), the actual acceleration Ar (current value) of the vehicle 1 calculated in STEP21 described above is used to perform the computation of the right side of expression (1) so as to calculate the acceleration resistance.

The rolling resistance is given according to the following expression (2).

Rolling resistance[kN]=Rolling resistance coefficient×(Total weight of vehicle[kN]×cos(gradient))   (2)

Here, cos(gradient)≈1 applies to the gradient of a normal road surface. Hence, in the present embodiment, the rolling resistance is calculated according to the following expression (3).

Rolling resistance[kN]=Rolling resistance coefficient×Total weight of vehicle[kN]   (3)

In this case, the "Total weight of vehicle" required for the computation of expression (3) is set to a predetermined fixed value, as described above. The "Rolling resistance coefficient" is also set to a predetermined fixed value. Alternatively, as the value of a gradient, the previous value already determined by the gradient estimator 24 may be used to determine the rolling resistance according to the aforesaid expression (2). If the "Total weight of vehicle" and the "Rolling resistance coefficient" are set to fixed values, then the rolling resistance calculated according to expression (3) will take a constant value; therefore, the value of the rolling resistance may be set to a fixed value in advance.

The air resistance is calculated according to the following expression (4).

$$\text{Air resistance [kN]} = \text{Air resistance coefficient } [kN \cdot h^2/m^2 \cdot km^2] \times \quad (4)$$
$$\text{Vehicle front projected area } [m^2] \times$$
$$\text{Vehicle speed } [km/h] \times \text{Vehicle speed } [km/h]$$

The "Air resistance coefficient" and the "Front projected area" in this expression (4) are fixed values determined beforehand in the present embodiment. Further, the detection value (current value) of the vehicle speed is used as the value of the "Vehicle speed" in expression (4) to perform the computation of the right side of expression (4) so as to calculate the air resistance.

The gradient resistance is calculated according to the following expression (5) from the driving force calculated in STEP31 and the acceleration resistance, the rolling resistance, and the air resistance calculated in the aforesaid STEP32 to STEP35.

Gradient resistance=Driving force−Acceleration resistance−Rolling resistance−Air resistance   (5)

This expression (5) denotes a force balance relationship between a driving force of the vehicle 1 and a traveling resistance (the total sum of an acceleration resistance, a rolling resistance, an air resistance, and a gradient resistance). The gradient resistance calculated according to expression (5) takes a positive value when the vehicle 1 travels on an up-slope road, while it takes a negative value when the vehicle 1 travels on a down-slope road.

Here, the following relationship expression (6) holds between a gradient resistance and the gradient of a road surface.

$$\text{Gradient resistance[kN]} = \text{Total vehicle weight[kN]} \times \sin(\text{Gradient}) \quad (6)$$

If the unit of the gradient (tilt angle) of a normal road surface is denoted by [rad], then $\sin(\text{Gradient}) \approx \text{Gradient}$ [rad], so that expression (6) is approximately rewritten to the following expression (7).

$$\text{Gradient resistance[kN]} = \text{Total vehicle weight[kN]} \times \text{Gradient[rad]} \quad (7)$$

Hence, if a gradient resistance is known, then the gradient of a road surface can be estimated according to expression (6) or (7). In this case, the gradient resistance and the gradient can be calculated by the processing of the aforesaid STEP31 to STEP35 by using the previous value Trc(k−1) of the target torque Trc as the value of the current output torque of the electric motor 2, the detection value (current value) of the vehicle speed, and the actual acceleration Ar (current value). According to the present embodiment, therefore, the target torque Trc(k−1), the detection value of the vehicle speed, and the actual acceleration Ar are input to the gradient estimator 24, and then the gradient of the road surface is estimated by the arithmetic processing described above from the aforesaid input values. This is the principle of the processing for estimating a gradient in the present embodiment.

However, the accuracy of the estimated value of a gradient calculated by the aforesaid arithmetic processing tends to deteriorate if the operational state of the wheel speed controller 7 is the ON state, the operational state of the brake pedal is the ON state, or the vehicle speed is low.

According to the present embodiment, therefore, the gradient estimator 24 determines in STEP36 following STEP35 whether one of a condition in which the operational state of the wheel speed controller 7 is the ON state, a condition in which the operational state of the brake pedal is the ON state, and a condition in which the vehicle speed is low (predetermined conditions causing an error of an estimated value of a gradient) holds. In this case, whether the operational state of the wheel speed controller 7 is the ON state is determined on the basis of the wheel speed control ON/OFF data (current value) input to the gradient estimator 24. Whether the operational state of the brake pedal is the ON state is determined on the basis of the detection value (current value) of a brake pedal manipulated variable input to the gradient estimator 24. Whether the vehicle speed is low is determined by determining whether the detection value (current value) of a vehicle speed input to the gradient estimator 24 is smaller than a predetermined vehicle speed (e.g., 7 km/h) set beforehand. The predetermined vehicle speed corresponds to the second predetermined value in the present invention.

If the determination result in STEP36 is negative, then it means that the gradient of a road surface can be accurately estimated. In this case, therefore, the gradient estimator 24 calculates the estimated value of the gradient according to expression (6) or (7) described above from the gradient resistance determined in STEP35 (STEP37). In other words, the estimated value of the gradient is updated. Further, the gradient estimator 24 sets (starts up) a timer for measuring time to begin the time measurement by the timer in STEP38, terminating the processing shown in FIG. 5 at the current arithmetic processing cycle (the processing in STEP22). In this case, the estimated value of the gradient newly calculated in STEP37 is output to the target acceleration determiner 25. The timer is used to measure the time during which the determination result of STEP36 continuously remains affirmative. If the determination result in STEP36 changes to negative, the timer is sequentially set in STEP38, so that no substantial measurement of time by the timer will be performed.

Meanwhile, if the determination result in STEP36 is affirmative, then the gradient estimator 24 further determines in STEP39 whether the time measured by the timer actuated in STEP37 has exceeded predetermined time (e.g., 3 seconds). At this time, if the time measured by the timer is the predetermined time or less and the determination result in STEP39 is negative, then the gradient estimator 24 terminates the processing in FIG. 5 at the current arithmetic processing cycle without updating the estimated value of the gradient. In this case, the estimated value of the gradient is held at the value immediately before the determination result of STEP36 changed to affirmative, and the value is output to the target acceleration determiner 25. If the time measured by the timer exceeds the predetermined time and the determination result in STEP39 is affirmative, that is, if the situation wherein the determination result in STEP36 is affirmative lasts for more than the predetermined time, then the gradient estimator 24 resets the estimated value of the gradient to zero, which is the value of the gradient on a flat road (STEP40) and terminates the processing illustrated in FIG. 5 at the current arithmetic processing cycle. Thus, in this case, the gradient value for a flat road (=0) is output as the estimated value of the gradient to the target acceleration determiner 25.

The above has described in detail the processing by the gradient estimator 24 in the aforesaid STEP22. The executing order of the steps, STEP31 to STEP34, of the processing described above may be arbitrarily changed. Alternatively, the determination processing in STEP36 may be carried out before the processing in STEP31 to STEP35, and the processing in STEP31 to STEP35 and STEP37 may be carried out if the determination result is negative. Further, the processing in STEP38 may be carried out when the situation wherein the determination result in STEP36 is negative is switched to the situation wherein the determination result in STEP36 is affirmative.

Supplementally, the processing in STEP31 to STEP35 and the processing in STEP37 correspond to the gradient estimated value calculator in the present invention. The determination processing in STEP36 corresponds to the determining means in the present invention.

An example of the manner in which the estimated value of a gradient determined as described above changes will be described with reference to FIG. 6. The first graph (the top graph) in FIG. 6 illustrates the time-dependent change in the operational state of the wheel speed controller 7, the second graph illustrates the time-dependent change of the operational state of the brake pedal. The third graph illustrates the time-dependent change in the vehicle speed, and the fourth graph (the bottom graph) illustrates the time-dependent change in an estimated value of a gradient.

In the example given in FIG. 6, before time t1, the operational state of the wheel speed controller 7 and the operational state of the brake pedal are both the OFF state, and the vehicle speed is higher than the predetermined vehicle speed. Hence, before time t1, the determination result in STEP36 is negative, and an estimated value of the gradient of a road surface is sequentially calculated and updated, and then sequentially output to the target acceleration determiner 25.

Subsequently, during the period from time t1 to time t2, the operational state of the wheel speed controller 7 switches to the ON state sooner than the predetermined time is reached. In this period, the determination result in the aforesaid STEP36 switches to affirmative, while the determination result in STEP39 switches to negative. Therefore, the calculation and updating of the estimated value of the gradient is interrupted, and the estimated value of the gradient to be sequentially output to the target acceleration determiner 25 will be held at the value calculated immediately before time t1.

Subsequently, in the period from time t2 to time t3, the operational state of the wheel speed controller 7 and the operational state of the brake pedal both switch to the OFF state while the vehicle speed is maintained to be higher than the predetermined vehicle speed. In this period, the determination result in the aforesaid STEP36 changes to negative. This resumes the calculation and updating of the estimated value of the gradient of the road surface.

Subsequently, in the period from time t3 to time t4, the operational state of the brake pedal switches to the ON state. Hence, in this period, the calculation and updating of the estimated value of the gradient is interrupted, as with the period from time t1 to time t2. Further, the estimated value of the gradient to be sequentially output to the target acceleration determiner 25 will be held at the value calculated immediately before time t3.

Subsequently, in the period from time t4 to time t5, the operational state of the wheel speed controller 7 and the operational state of the brake pedal both switch to the OFF state while the vehicle speed is maintained to be higher than the predetermined vehicle speed. In this period, the calculation and updating of the estimated value of the gradient of the road surface is resumed, as with the period from time t2 to time t3.

Subsequently, from time t5 to time t7, the operational state of the brake pedal stays in the ON state for longer than the predetermined time. At this time, from time t5 until time t6 when the predetermined time elapses, the determination result in the aforesaid STEP36 becomes affirmative, and the determination result in STEP39 becomes negative. Hence, the calculation and updating of the estimated value of the gradient is interrupted, and the estimated value of the gradient to be sequentially output to the target acceleration determiner 25 will be held at the value calculated immediately before time t5. Then, after time t6 when the predetermined time elapses from time t5, the determination result in STEP39 becomes affirmative. Thus, the estimated value of the gradient is reset to zero, which is output to the target acceleration determiner 25. The operation of the brake pedal before time t7 causes the vehicle speed to reduce down to zero, and the vehicle 1 stops.

Thereafter, at time t7, the operational state of the brake pedal is switched to the OFF state, causing the vehicle 1 to start traveling. Then, at time t8, the vehicle speed rises and exceeds the predetermined vehicle speed. At this time, until the period of time t6 to time t8, the determination result in STEP36 changes to affirmative and the determination result in STEP39 changes to affirmative, so that the estimated value of the gradient sequentially output to the target acceleration determiner 25 is maintained at zero. Then, after time t8, the determination result in STEP36 changes to negative and the calculation and updating of the estimated value of the gradient is resumed.

As described above, in the situation wherein the determination result in STEP36 changes to affirmative when the processing by the gradient estimator 24 is carried out (the situation wherein any of the conditions leading to an error of the estimated value of the gradient holds), the calculation and the updating of the estimated value of the gradient remains interrupted until the time during which the situation lasts exceeds the predetermined time. The estimated value of the gradient output to the target acceleration determiner 25 is held at the value immediately before the situation takes place. Further, if the situation lasts longer than the predetermined time, then the estimated value of the gradient to be output to the target acceleration determiner 25 is reset to zero.

The arrangement described above makes it possible to prevent the target acceleration determiner 25, which will be described in detail later, from determining an inappropriate target acceleration Ac for an actual gradient by using an estimated gradient value having a large error.

In the present embodiment, one of a condition in which the operational state of the wheel speed controller 7 is the ON state, a condition in which the operational state of the brake pedal is the ON state, and a condition in which the vehicle speed is low has been established as a predetermined condition which leads to an error of the estimated value of a gradient, and it has been determined in STEP36 whether the condition holds. However, a condition or conditions other than those described above may be added, as necessary, to the conditions for determination in STEP36. Further, the wheel speed controller 7 may be omitted. In such a case, the conditions related to the wheel speed controller 7 may be removed from the conditions for determination in STEP36.

Returning to the description of FIG. 4, after estimating the gradient of the road surface by the gradient estimator 24 as described above, the vehicle control unit 5 determines in STEP23 whether the road surface on which the vehicle 1 is traveling is a down-slope road on the basis of the estimated value (current value) of the gradient. In this case, whether the road surface is a down-slope road is determined by determining whether the estimated value of the gradient is a negative value. It may alternatively be determined that the road surface is a down-slope road if the estimated value of the gradient is a negative value and if the absolute value of the negative value is a predetermined value or more in the vicinity of zero. In other words, even if the estimated value of the gradient is a negative value, it may be determined that the road surface is not a down-slope road if the absolute value of the negative value is extremely small.

Further, if the determination result in STEP23 is affirmative, then the vehicle control unit 5 determines the target acceleration Ac by the target acceleration determiner 25 (STEP24).

In this case, according to the present embodiment, the target acceleration determiner 25 determines the target acceleration Ac by adding a correction amount Ac2 of the target acceleration based on a vehicle speed to a basic value Ac1 of the target acceleration based on the estimated value of a gradient.

To be more specific, the target acceleration determiner 25 determines the basic value Ac1 according to a table (a table which specifies the relationship between the gradient and the basic value Ac1 of a target acceleration) set beforehand, as indicated by a solid line "a" in FIG. 7(a), from a received estimated value (current value) of the gradient. Here, the table indicated by the solid line "a" in FIG. 7(a) has been set such that the basic value Ac1 monotonously increases to acceleration on an increasing-speed side (>0) from acceleration on a decreasing-speed side (<0) of the vehicle 1 as the magnitude (absolute value) of a gradient (gradient of a down-slope road<0) increases from zero. In this case, according to the present embodiment, the basic value Ac1 of the target acceleration will be an acceleration on the decreasing-speed side (<0) if the absolute value of the gradient of a down-slope road is extremely small and smaller than a predetermined value |θx| (if the down-slope road is close to a flat road), whereas the basic value Ac1 will be an acceleration on the increasing-speed side (>0) if the absolute value of the gradient is larger than the predetermined value |θx|. If the gradient of a road surface having a tilt angle α [deg] is defined as the gradient of tan α×100[%], then the aforesaid predetermined value |θx| denotes a gradient of, for example, about 5% to about 9%. The basic value Ac1 denotes an acceleration of about 0.1 G to about 0.3 G when the gradient of a road surface is, for example, 40%.

Further, from a received vehicle speed detection value (current value), the target acceleration determiner 25 determines the correction amount Ac2 according to a table (a table which specifies the relationship between the vehicle speed and the correction amount Ac2 of a target acceleration) set beforehand, as indicated by a solid line "b" in FIG. 7(b). Here, the table indicated by the solid line "b" in FIG. 7(b) has been set such that the correction amount Ac2 increases to a value on the increasing-speed side (>0) as a vehicle speed decreases in a low-speed range in which the vehicle speed is smaller than a predetermined value Vx, whereas the correction amount Ac2 becomes zero in a medium-to-high-speed range in which the vehicle speed exceeds the predetermined value Vx. Incidentally, the aforesaid predetermined value Vx denotes a vehicle speed of, for example, about 10 [km/h] to about 20 [km/h]. The correction amount Ac2 is an acceleration of about 0.05 G to about 0.1 G at the maximum.

Then, the target acceleration determiner 25 adds up the basic value Ac1 and the correction amount Ac2, which have been determined as described above, to determine the target acceleration Ac.

The target acceleration Ac determined as described above is basically a target acceleration which causes the vehicle speed of the vehicle 1 to slowly increase at an acceleration on the increasing-speed side (>0) matched to the gradient of a road surface in the case where the operational states of both the accelerator (gas) pedal and the brake pedal are the OFF state when the vehicle 1 is traveling on a down-slope road, the absolute value of the gradient of the down-slope road being large to a certain extent (larger than the predetermined value |θx|). The target acceleration Ac is a target acceleration which causes the vehicle speed of the vehicle 1 to slowly decrease at an acceleration on the decreasing-speed side (<0) matched to the gradient of a road surface in the case where the operational states of both the accelerator (gas) pedal and the brake pedal are the OFF state when the vehicle 1 is traveling on a down-slope road, the absolute value of the gradient of the down-slope road being sufficiently small (smaller than the predetermined value |θx|). In other words, the target acceleration Ac is a target acceleration which makes it possible to allow the vehicle 1 to travel on a down-slope road without causing the vehicle speed to rapidly increase or causing the driver to feel uncomfortable even when the brake pedal is not operated.

In this case, a table related to the basic value Ac1 and the correction amount Ac2 is set such that the target acceleration Ac on the increasing-speed side is smaller than an acceleration on the increasing-speed side generated in the vehicle 1 (hereinafter referred to as the down-slope road travel acceleration from the basic regenerative torque for a flat road) if the vehicle 1 travels on a down-slope road while outputting the aforesaid basic target torque Trs (=regenerative torque, which will be hereinafter referred to as the basic regenerative torque for a flat road), which is obtained when the operational state of the accelerator (gas) pedal is the OFF state, from the electric motor 2, that is, if the vehicle 1 travels on a down-slope road while generating a weak braking force equivalent to an engine brake in the vehicle 1 by the basic regenerative torque for a flat road of the electric motor 2.

For example, the down-slope road travel acceleration from the basic regenerative torque for a flat road in the medium-to-high-speed range in which the vehicle speed is larger than the predetermined value Vx will be as indicated by a two-dot chain line "c" in FIG. 7(a). Further, the basic value Ac1, which provides the target acceleration Ac in the medium-to-high-speed range, will be such that the acceleration on the increasing-speed side (>0) is smaller than a down-slope road travel acceleration from the basic regenerative torque for a flat road.

According to the present embodiment, in the medium-to-high-speed range in which the vehicle speed is larger than the predetermined value Vx, the target acceleration Ac agrees with the basic value Ac1 based on a gradient, whereas the target acceleration Ac will be larger toward the increasing-speed side by the correction amount Ac2 than the basic value Ac1 in the low-speed range wherein the vehicle speed is smaller than the predetermined value Vx. This is because of the following reason. In the low-speed range, the driver tends to feel a change in vehicle speed more easily than in the medium-to-high-speed range. Therefore, if the target acceleration Ac in the low-speed range is set to approximately the same level as the target acceleration Ac in the medium-to-high-speed range, then deceleration in the low-speed range is easily felt in an emphasized manner. In the present embodiment, therefore, the target acceleration Ac in the low-speed range is set farther toward the increasing-speed side than the target acceleration Ac in the medium-to-high-speed range is.

The above has described in detail the processing by the target acceleration determiner 25 in STEP24.

Supplementally, in the present embodiment, the correction amount Ac2 has been added to the basic value Ac1 to determine the target acceleration Ac. Alternatively, however, the basic value Ac1 may be multiplied by a correction coefficient based on vehicle speed to determine the target acceleration Ac. Further alternatively, a map which combines the tables in FIG. 7(a) and FIG. 7(b) may be prepared beforehand and the target acceleration Ac may be directly determined from an estimated value of a gradient and a detection value of a vehicle speed according to the prepared map. Correcting the basic value Ac1 is not necessarily required; instead, the basic value Ac1 may be directly used as the target acceleration Ac. Further, in place of using the tables in FIG. 7(a) and FIG. 7(b), an arithmetic expression which approximates the relationship specified by the tables may be used to determine the basic value Ac1 and the correction amount Ac2.

Returning to the description of FIG. 4, the vehicle control unit 5 carries out the processing by the down-slope road regeneration correction amount determiner 26 in STEP25 to STEP29 after determining the target acceleration Ac by the target acceleration determiner 25 as described above.

At this time, the down-slope road regeneration correction amount determiner 26 first determines in STEP25 whether the operational state of the accelerator (gas) pedal is the ON state on the basis of the detection value (current value) of the accelerator (gas) pedal manipulated variable. If the determination result is negative, then the down-slope road regeneration correction amount determiner 26 further determines in STEP26 whether the actual acceleration Ar (current value) is larger than the target acceleration Ac (current value).

If the determination result is affirmative, then the down-slope road regeneration correction amount determiner 26 further determines in STEP27 whether the operational state of the brake pedal is the ON state.

Subsequently, if the determination result in STEP27 is negative, that is, if the operational states of both the accelerator (gas) pedal and the brake pedal are the OFF state, and Ar is larger than Ac (Ar>Ac), then the down-slope road regeneration correction amount determiner 26 increases, in STEP28, a down-slope road regeneration correction amount ΔTrd from a previous value by a predetermined value, which has been set beforehand, and terminates the processing of the current arithmetic processing cycle. In this case, ΔTrd≦0 in the present embodiment, so that increasing ΔTrd in STEP28 means increasing the magnitude (the absolute value), that is, increasing the regenerative torque component of the electric motor 2 based on ΔTrd. Therefore, the processing in STEP28 is accomplished by adding a negative predetermined value to ΔTrd or by subtracting a positive predetermined value from ΔTrd. Incidentally, the down-slope road regeneration correction amount ΔTrd is initialized to zero at the time of starting up the vehicle control unit 5.

If the determination result in STEP27 is affirmative, that is, if the operational state of the brake pedal is the ON state, then the down-slope road regeneration correction amount determiner 26 terminates the processing of the current arithmetic processing cycle without updating the down-slope road regeneration correction amount ΔTrd (maintaining the previous value). This restricts or prohibits the down-slope road regeneration correction amount ΔTrd from increasing if the operational state of the brake pedal switches from the OFF state to the ON state while the vehicle 1 is traveling on a down-slope road. More specifically, the down-slope road regeneration correction amount ΔTrd is maintained at a value immediately before the determination result in STEP27 switched to affirmative.

Meanwhile, if the determination result in STEP23 is negative (if the road surface on which the vehicle 1 is traveling is a flat road or an up-slope road), or if the determination result in STEP25 is affirmative (if the operational state of the accelerator (gas) pedal switches to the ON state during a travel on a down-slope road), or if the determination result in STEP26 is negative (if the actual acceleration Ar becomes the target acceleration Ac or less when the operational state of the accelerator (gas) pedal is the OFF state during a travel on a down-slope road), then the down-slope road regeneration correction amount determiner 26 decreases the down-slope road regeneration correction amount ΔTrd from a previous value by a predetermined value which has been set beforehand (STEP29) and terminates the processing of the current arithmetic processing cycle. Decreasing ΔTrd in STEP29 means decreasing the magnitude (absolute value), that is, decreasing the regenerative torque component of the electric motor 2 based on ΔTrd. Hence, the processing in STEP29 is accomplished by adding a positive predetermined value to ΔTrd or by subtracting a negative predetermined value from ΔTrd. In the present embodiment, the down-slope road regeneration correction amount ΔTrd is zero or a negative value (the lower limit value of the absolute value being zero). For this reason, if the value obtained by decreasing the down-slope road regeneration correction amount ΔTrd in STEP29 becomes a positive value, then the value of the down-slope road regeneration correction amount ΔTrd is set to zero.

The processing in STEP25 to STEP29 represents the detailed processing by the down-slope road regeneration correction amount determiner 26.

If the operational states of the accelerator (gas) pedal and the brake pedal are both the OFF state when the vehicle 1 is traveling on a down-slope road, then the processing in STEP28 or STEP29 will be sequentially carried out by the down-slope road regeneration correction amount determiner 26 on the basis of the magnitude relationship between the actual acceleration Ar and the target acceleration Ac. In other words, the absolute value of the down-slope road regeneration correction amount ΔTrd (≦0) is gradually increased in a situation wherein Ar>Ac holds, whereas the absolute value of the down-slope road regeneration correction amount ΔTrd is gradually decreased in a situation wherein Ar<Ac holds.

In this case, in the situation wherein the operational states of the accelerator (gas) pedal and the brake pedal are both the OFF state, the target torque Trc of the electric motor 2 will be a regenerative torque obtained by adding the down-slope road regeneration correction amount ΔTrd to the basic regenerative torque for a flat road serving as the basic target torque Trs. Hence, in the situation wherein Ar is larger than Ac (Ar>Ac), the magnitude of the regenerative torque output by the electric motor 2 is gradually increased to a value which is larger than that of the basic regenerative torque for a flat road. In a situation wherein Ar is smaller than Ac (Ar<Ac), the magnitude of the regenerative torque output by the electric motor 2 is gradually decreased to approach to the basic regenerative torque for a flat road. Thus, the regenerative torque output by the electric motor 2, that is, the braking force of the vehicle 1 based on the regenerative torque, is increased or decreased to approximate (or converge) the actual acceleration Ar to the target acceleration Ac.

If the driver operates the brake pedal, causing the operational state of the brake pedal to switch from the OFF state to the ON state with the operational state of the accelerator (gas) pedal being held in the OFF state in the situation wherein Ar is larger than Ac (Ar>Ac) while the vehicle 1 is traveling on a down-slope road, then the determination results in STEP26 and STEP27 will be both affirmative as long as the situation wherein Ar is larger than Ac (Ar>Ac) continues. Thus, an increase in the down-slope road regeneration correction amount ΔTrd is restricted or prohibited, and the down-slope road regeneration correction amount ΔTrd is held at a value immediately before the operation of the brake pedal was begun. This makes it possible to prevent an excessive braking force which is not intended by the driver from being generated in the vehicle 1. If the brake pedal is operated, which leads to the relationship of Ar≦Ac, then the determination result in STEP26 will be negative, so that the down-slope road regeneration correction amount ΔTrd will gradually decrease. As a result, the output torque of the electric motor 2 will gradually approach to a target torque obtained by correcting the basic target torque Trs on the basis of the brake regeneration correction amount ΔTrb.

Further, while the vehicle 1 is traveling on a down-slope road, if the driver operates the accelerator (gas) pedal, causing the operational state of the accelerator (gas) pedal to be changed from the OFF state to the ON state, then the determination result in STEP25 switches to affirmative. This in turn causes the down-slope road regeneration correction amount ΔTrd to gradually decrease independently of the magnitude relationship between the actual acceleration Ar and the target acceleration Ac. Consequently, the output torque of the electric motor 2 gradually approaches to the basic target torque Trs, which provides a driving torque. Thus, the vehicle speed of the vehicle 1 can be increased according to driver's intentions, while preventing a sudden change in the output torque of the electric motor 2.

If the road surface on which the vehicle 1 is traveling changes from a down-slope road to a flat road or an up-slope road, then the determination result in STEP23 switches to negative. Hence, the down-slope road regeneration correction amount ΔTrd gradually decreases independently of the magnitude relationship between the actual acceleration Ar and the target acceleration Ac. Consequently, the output torque of the electric motor 2 gradually approaches to the basic target torque Trs or the value obtained by correcting the basic target torque Trs on the basis of the brake regeneration correction amount $\Delta$Trb. This arrangement makes it possible to prevent a sudden change in the output torque of the electric motor 2 immediately after the road surface changes from a down-slope road to a flat road or an up-slope road.

FIG. 8 illustrates an example of how the output torque or the like of the electric motor 2 changes while the vehicle 1 is traveling on a down-slope road. In this case, the first (top) graph of FIG. 8 illustrates the configuration of a road surface on which the vehicle 1 travels, the second graph illustrates a change in the vehicle speed, and the third graph illustrates a change in the operational state of the accelerator (gas) pedal. Further, the fourth graph illustrates a change in the operational state of the brake pedal, the fifth graph illustrates a change in the actual acceleration Ar of the vehicle 1, and the sixth (bottom) graph illustrates a change in the output torque of the electric motor 2. The axes of abscissas of these graphs indicate the horizontal position of the vehicle 1 in the advancing direction thereof.

In this example, the road surface is a down-slope road with a gentle gradient extending from position x1 to position x6. The gradient of the down-slope road is relatively large from position x6 to position x7. Then, the gradient of the road surface from position x7 and farther gradually decreases, so that the down-slope road changes into a flat road. The operational state of the accelerator (gas) pedal is changed from the ON state to the OFF state from position x1 immediately after the road surface changes from the flat road surface to the down-slope road surface. The operational state of the brake pedal is maintained at the OFF state until the horizontal position of the vehicle 1 reaches position x2. At this time, as illustrated in the sixth graph, the output torque of the electric motor 2 from position x1 to x2 will be a regenerative torque obtained by adding the down-slope road regeneration correction amount $\Delta$Trd to the basic target torque Trs, which is a regenerative torque. The braking force of the vehicle 1 from the regenerative torque causes the actual acceleration Ar to converge finally to a target acceleration (acceleration on the increasing-speed side in this case) based on the gradient of the road surface. At this time, the magnitude of the target acceleration is small, so that the vehicle speed of the vehicle 1 is approximately maintained at a vehicle speed immediately before the operational state of the accelerator (gas) pedal was switched to the OFF state (or the vehicle speed is slightly increased).

When the vehicle 1 reaches position x2 in the middle of the down-slope road, the driver operates the brake pedal, switching the operational state of the brake pedal from the OFF state to the ON state. At this time, as illustrated in the sixth graph, the output torque of the electric motor 2 will be a regenerative torque obtained by adding the down-slope road regeneration correction amount $\Delta$Trd and the brake regeneration correction amount $\Delta$Trb to the basic target torque Trs (regenerative torque). The braking force of the vehicle 1 based on the regenerative torque causes the actual acceleration Ar to change to acceleration on the decreasing-speed side of the vehicle 1, thereby decreasing the vehicle speed of the vehicle 1. At this time, the brake regeneration correction amount $\Delta$Trb increases as the brake pedal manipulated variable increases. Further, at this time, the actual acceleration Ar becomes smaller than a target acceleration, so that the down-slope road regeneration correction amount $\Delta$Trd gradually decreases.

Subsequently, when the vehicle 1 reaches position x3, the driver releases the brake pedal, causing the operational state of the brake pedal to change from the ON state to the OFF state. At this time, as illustrated in the sixth graph, the output torque of the electric motor 2 goes back to the regenerative torque obtained by adding the down-slope road regeneration correction amount $\Delta$Trd to the basic target torque Trs (regenerative torque). The braking force of the vehicle 1 based on the regenerative torque causes the actual acceleration Ar of the vehicle 1 to converge finally to a target acceleration based on the gradient of the road surface. At this time, the magnitude of the target acceleration is small, so that the vehicle speed of the vehicle 1 is approximately maintained at a vehicle speed immediately before the operational state of the brake pedal was switched to the OFF state (or the vehicle speed is slightly increased).

Subsequently, when the vehicle 1 reaches position x4 in the middle of the down-slope road, the driver operates the accelerator (gas) pedal, switching the operational state of the accelerator (gas) pedal from the OFF state to the ON state. At this time, as illustrated in the sixth graph, the output torque of the electric motor 2 will be a torque obtained by adding the down-slope road regeneration correction amount $\Delta$Trd, which is gradually decreased, to the basic target torque Trs, which changes into a drive torque. Thus, the output torque of the electric motor 2 is controlled to the basic target torque Trs which eventually turns into a drive torque. The output torque of the electric motor 2 turns into a drive torque as described above, thus causing a driving force to act on the vehicle 1 with a resultant increase in the vehicle speed.

Subsequently, when the vehicle 1 reaches position x5 in the middle of the down-slope road, the driver releases the accelerator (gas) pedal, so that the operational state of the accelerator (gas) pedal switches from the ON state to the OFF state. At this time, as illustrated in the sixth graph, the output torque of the electric motor 2 becomes the regenerative torque obtained by adding the down-slope road regeneration correction amount $\Delta$Trd to the basic target torque Trs, which becomes a regenerative torque. The braking force of the vehicle 1 based on the regenerative torque causes the actual acceleration Ar of the vehicle 1 to converge finally to a target acceleration based on the gradient of the road surface. At this time, the magnitude of the target acceleration is small, so that the vehicle speed of the vehicle 1 is approximately maintained at a vehicle speed immediately before the operational state of the accelerator (gas) pedal was switched to the OFF state (or the vehicle speed is slightly increased).

Subsequently, when the vehicle 1 reaches position x6, at which the gradient of the down-slope road increases, with the operational states of both the accelerator (gas) pedal and the brake pedal maintained at the OFF state, the actual acceleration Ar of the vehicle 1 increases to the increasing-speed side. Hence, the down-slope road regeneration correction amount $\Delta$Trd increases, and a regenerative torque obtained by adding the increased down-slope road regeneration correction amount $\Delta$Trd to the basic target torque Trs is output from the electric motor 2. Then, finally, a braking force generated in the vehicle 1 by the regenerative torque output from the electric motor 2 causes the actual acceleration Ar to converge to a target acceleration based on the gradient of the road surface. At this time, the vehicle speed slowly increases.

Subsequently, when the vehicle 1 reaches position x7 near the end of the down-slope road, the actual acceleration Ar diminishes and the down-slope road regeneration correction amount $\Delta$Trd reduces. Accordingly, the output torque (regenerative torque) of the electric motor 2 as the torque obtained by adding the down-slope road regeneration correction amount $\Delta$Trd to the basic target torque Trs decreases.

Thereafter, the vehicle 1 stops (the vehicle speed reaches zero) when the driver operates the brake pedal when the vehicle 1 reaches position x8 on the flat road following the down-slope road. In this case, immediately after the operational state of the brake pedal is switched from the OFF state to the ON state by operating the brake pedal, the regenerative torque obtained by adding the brake regeneration correction amount ΔTrb to the basic target torque Trs is output from the electric motor 2.

According to the vehicle 1 of the present embodiment described above, when the vehicle 1 travels on a down-slope road, the regenerative torque of the electric motor 2 is controlled by increasing or decreasing the down-slope road regeneration correction amount ΔTrd such that the actual acceleration Ar of the vehicle 1 approaches to the target acceleration Ac based on the gradient of a road surface. This arrangement makes it possible to perform the regenerative operation of the electric motor 2 to allow acceleration, which is suited to the gradient of a road surface, to be generated in the vehicle 1, independently of disturbance factors, such as the direction of wind blowing onto the vehicle 1 and the number of persons in the vehicle 1. Further, since the acceleration of the vehicle 1 on a down-slope road will be controlled to suit the gradient of the down-slope road, the travel of the vehicle 1 on the down-slope road can be properly accomplished without the need for frequent operation of the brake pedal or the accelerator (gas) pedal.

In the embodiment described above, the gradient of a road surface has been estimated by the aforesaid arithmetic processing; alternatively, however, a tilt sensor provided in a vehicle may be used to detect the gradient of a road surface.

Further, in the present embodiment, the down-slope road regeneration correction amount ΔTrd when the operational states of both the accelerator (gas) pedal and the brake pedal are the OFF state has been determined by increasing or decreasing the correction amount ΔTrd by a predetermined value according to the magnitude relationship between the actual acceleration Ar and the target acceleration Ac. Alternatively, however, the down-slope road regeneration correction amount ΔTrd may be determined by a feedback law, such as the PI law or the PID law, from a difference between the actual acceleration Ar and the target acceleration Ac.

What is claimed is:

1. An electric vehicle comprising:
   an electric motor, which is capable of selectively outputting a drive torque and a regenerative torque, as a traveling motive power source;
   a basic target torque determining means which determines, on the basis of an operational state of an accelerator pedal, a basic target torque which is a basic target torque of the electric motor and which becomes a regenerative torque in the case where the operational state of the accelerator pedal of the vehicle is an OFF state;
   a gradient grasping means which grasps the gradient of a road surface on which the vehicle is traveling;
   a target acceleration determining means which determines, on the basis of the gradient of the road surface grasped by the gradient grasping means, a target acceleration which is a target acceleration of the vehicle in the case where the operational state of a brake pedal of the vehicle and the operational state of the accelerator pedal thereof are the OFF state when the vehicle is traveling on a down-slope road and which is a target acceleration for restraining an increase in the speed of the vehicle more than an acceleration generated in the vehicle in the case where it is assumed that the operational state of the brake pedal of the vehicle and the operational state of the accelerator pedal thereof are the OFF state and that the vehicle is traveling on the down-slope road in a state wherein the electric motor is generating an output torque of the basic target torque;
   an actual acceleration grasping means which grasps an actual acceleration, which is a real acceleration of the vehicle;
   a down-slope road regeneration correction amount determining means which determines, on the basis of the actual acceleration and the target acceleration, a down-slope road regeneration correction amount, which is a correction amount of a regenerative torque of the electric motor for bringing the actual acceleration close to the target acceleration when the vehicle is traveling on the down-slope road;
   a target torque determining means which determines a target torque of the electric motor by correcting the basic target torque on the basis of at least the down-slope road regeneration correction amount; and
   a motor controlling means which controls the energization of the electric motor such that the electric motor generates an output torque of the target torque.

2. The electric vehicle according to claim 1, wherein the down-slope road regeneration correction amount determining means determines the down-slope road regeneration correction amount such that the down-slope road regeneration correction amount is gradually increased or decreased according to a magnitude relationship between the actual acceleration and a target acceleration in the case where the operational state of the accelerator pedal of the vehicle and the operational state of the brake pedal thereof are the OFF state when the vehicle is traveling on a down-slope road.

3. The electric vehicle according to claim 1, wherein the down-slope road regeneration correction amount determining means further comprises a means which gradually decreases the down-slope road regeneration correction amount in the case where the gradient of a road surface grasped by the gradient grasping means has changed from a gradient of a down-slope road to a gradient of a flat road or a gradient of an up-slope road.

4. The electric vehicle according to claim 1, wherein
   the basic target torque determined by the basic target torque determining means in the case where the operational state of the accelerator pedal of the vehicle is the ON state is a drive torque, and
   the down-slope road regeneration correction amount determining means further comprises a means which gradually decreases the down-slope road regeneration correction amount in the case where the operational state of the accelerator pedal of the vehicle changes from the OFF state to the ON state when the vehicle is traveling on the down-slope road.

5. The electric vehicle according to claim 1, wherein the down-slope road regeneration correction amount determining means further comprises a means which limits an increase in the down-slope road regeneration correction amount in the case where the operational state of the brake pedal of the vehicle changes from the OFF state to the ON state while the vehicle is traveling on the down-slope road.

6. The electric vehicle according to claim 5, wherein the means which limits an increase in the down-slope road regeneration correction amount holds the down-slope road regeneration correction amount at a value immediately before the operational state of the brake pedal changed from the OFF state to the ON state in the case where the operational state of the brake pedal of the vehicle changes from the OFF state to the ON state while the vehicle is traveling on the down-slope road.

7. The electric vehicle according to claim 5, further comprising a brake regeneration correction amount determining means which determines a brake regeneration correction amount, which is a correction amount of a regenerative torque of the electric motor based on the operational state of the brake pedal of the vehicle, on the basis of the operational state of the brake pedal, wherein the target torque determining means determines the target torque by correcting the basic target torque on the basis of the down-slope road regeneration correction amount and the brake regeneration correction amount when the vehicle is traveling on a down-slope road.

8. The electric vehicle according to claim 1, wherein the gradient grasping means comprises a gradient estimated value calculating means which calculates an estimated value of the gradient of the road surface by predetermined arithmetic processing from at least the target torque as the output torque generated by the electric motor, the detection value of a vehicle speed of the vehicle, and the actual acceleration, and a determining means which determines whether or not the drive state of the vehicle is a drive state which establishes a predetermined condition leading to an error of an estimated value of the gradient of the road surface calculated by the gradient estimated value calculating means, and in the case where a determination result given by the determining means is negative, then the estimated value of the gradient of the road surface is sequentially calculated by the gradient estimated value calculating means and the calculated estimated value is output to the target acceleration determining, and in the case where the determination result given by the determining means is affirmative, then the estimated value of the gradient of the road surface calculated by the gradient estimated value calculating means immediately before the determination result became affirmative is output to the target acceleration determining means.

9. The electric vehicle according to claim 8, wherein the predetermined condition includes at least one of a condition wherein the operational state of the brake pedal of the vehicle is the ON state and a condition wherein a detection value of the vehicle speed is a low vehicle speed which is lower than a first predetermined value.

10. The electric vehicle according to claim 8, further comprising a wheel speed controlling means which carries out control processing for adjusting a driving force or a braking force to be imparted to the wheels of the vehicle so as to match the wheel speed of the vehicle to an actual vehicle speed of the vehicle, wherein the predetermined condition includes a condition wherein the control processing by the wheel speed controlling means is being carried out.

11. The electric vehicle according to claim 8, wherein the gradient grasping means comprises a means which measures the time during which the determination result of the determining means continuously remains affirmative, and in the case where the measured time exceeds predetermined time, a value set beforehand as the value of the gradient of a flat road is output to the target acceleration determining means until the determination result of the determining means changes to negative.

12. The electric vehicle according to claim 1, wherein the target acceleration determining means is a means which determines the target acceleration on the basis of the gradient of the road surface grasped by the gradient grasping means and the detection value of the vehicle speed of the vehicle, and a target acceleration determined by the target acceleration determining means in the case where the detection value of the vehicle speed indicates a vehicle speed which is smaller than a second predetermined value is a target acceleration farther on the increasing-speed side of the vehicle than a target acceleration determined by the target acceleration determining means in the case where the detection value of the vehicle speed is larger than the second predetermined value.

13. A regenerative control method for an electric vehicle for a down-slope road travel of an electric vehicle equipped with an electric motor, which is capable of selectively outputting a drive torque and a regenerative torque, as a traveling motive power source, the regenerative control method comprising:

a step for determining a basic target torque, which is a basic target torque of the electric motor and which becomes a regenerative torque in the case where the operational state of an accelerator pedal of the vehicle is an OFF state, on the basis of the operational state of the accelerator pedal;

a step for determining, on the basis of the gradient of a road surface on which the vehicle is traveling, a target acceleration which is a target acceleration of the vehicle in the case where the operational state of a brake pedal of the vehicle and the operational state of the accelerator pedal thereof are the OFF state while the vehicle is traveling on a down-slope road and which is a target acceleration for restraining an increase in the speed of the vehicle more than an acceleration generated in the vehicle in the case where it is assumed that the operational state of the brake pedal of the vehicle and the operational state of the accelerator pedal thereof are the OFF state and that the vehicle is traveling on the down-slope road in a state wherein the electric motor is generating an output torque of the basic target torque;

a step for determining, on the basis of an actual acceleration and a target acceleration, a down-slope road regeneration correction amount which is a correction amount of a regenerative torque of the electric motor for bringing the actual acceleration, which is the real acceleration of the vehicle, close to the target acceleration while the vehicle is traveling on the down-slope road; and a step for determining a target torque of the electric motor by correcting the basic target torque on the basis of at least the down-slope road regeneration correction amount and for controlling the energization of the electric motor such that the electric motor generates an output torque of the target torque.

* * * * *